United States Patent [19]

Peterson

[11] Patent Number: 5,739,501
[45] Date of Patent: Apr. 14, 1998

[54] METHOD AND APPARATUS FOR FORMING BLOWER HOUSINGS

[75] Inventor: Rand L. Peterson, Sebring, Ohio

[73] Assignee: Tru-Cut, Inc., Sebring, Ohio

[21] Appl. No.: 731,252

[22] Filed: Oct. 11, 1996

[51] Int. Cl.[6] ................................................ B23K 11/11
[52] U.S. Cl. ................................................... 219/117.1
[58] Field of Search .......................... 219/117.1, 86.25, 219/86.7, 87, 91.2, 108, 56.1, 56.22, 86.9, 91.21; 228/6.1, 47

[56] References Cited

U.S. PATENT DOCUMENTS

| | | | |
|---|---|---|---|
| 5,188,276 | 2/1993 | Furuya et al. | 228/6.1 |
| 5,548,096 | 8/1996 | Akasaka et al. | 219/117.1 |
| 5,593,604 | 1/1997 | Beasley et al. | 219/117.1 |

*Primary Examiner*—Adolf Berhane
*Attorney, Agent, or Firm*—Sand & Sebolt

[57] ABSTRACT

A method and apparatus for forming a metal housing, such as a blower housing, by successively securing a wrap panel to spaced-apart end panels by a series of welds. The end panels are rotated through a series of steps by a work-holding subassembly while a pair of primary welder subassemblies reciprocate in a linear path through a plurality of weld positions and apply a plurality of spot welds to the circumference of the generally circular end panels joining the end panels to the wrap panel. A panel advancing subassembly pushes a rear end of the wrap panel to assist the forward wrapping movement of the wrap panel around the end panels A pair of secondary welder subassemblies, each having a pinch gun welder, move horizontally along another linear path and perform a plurality of welds along a linear lip of the blower housing. The primary welder subassemblies are then indexed horizontally along another linear path to perform spot welds along a linear aligned section of the blower housing. A plurality of pneumatic cylinders move the primary and the secondary welders linearly and horizontally along a plurality of guide rails. One side of the apparatus is adjustable toward or away from the other side to allow the apparatus to receive wrap panels of different sizes. The height of the secondary welder subassemblies is adjustable to align the pinch gun welders with lips of blower housings of different sizes.

31 Claims, 29 Drawing Sheets

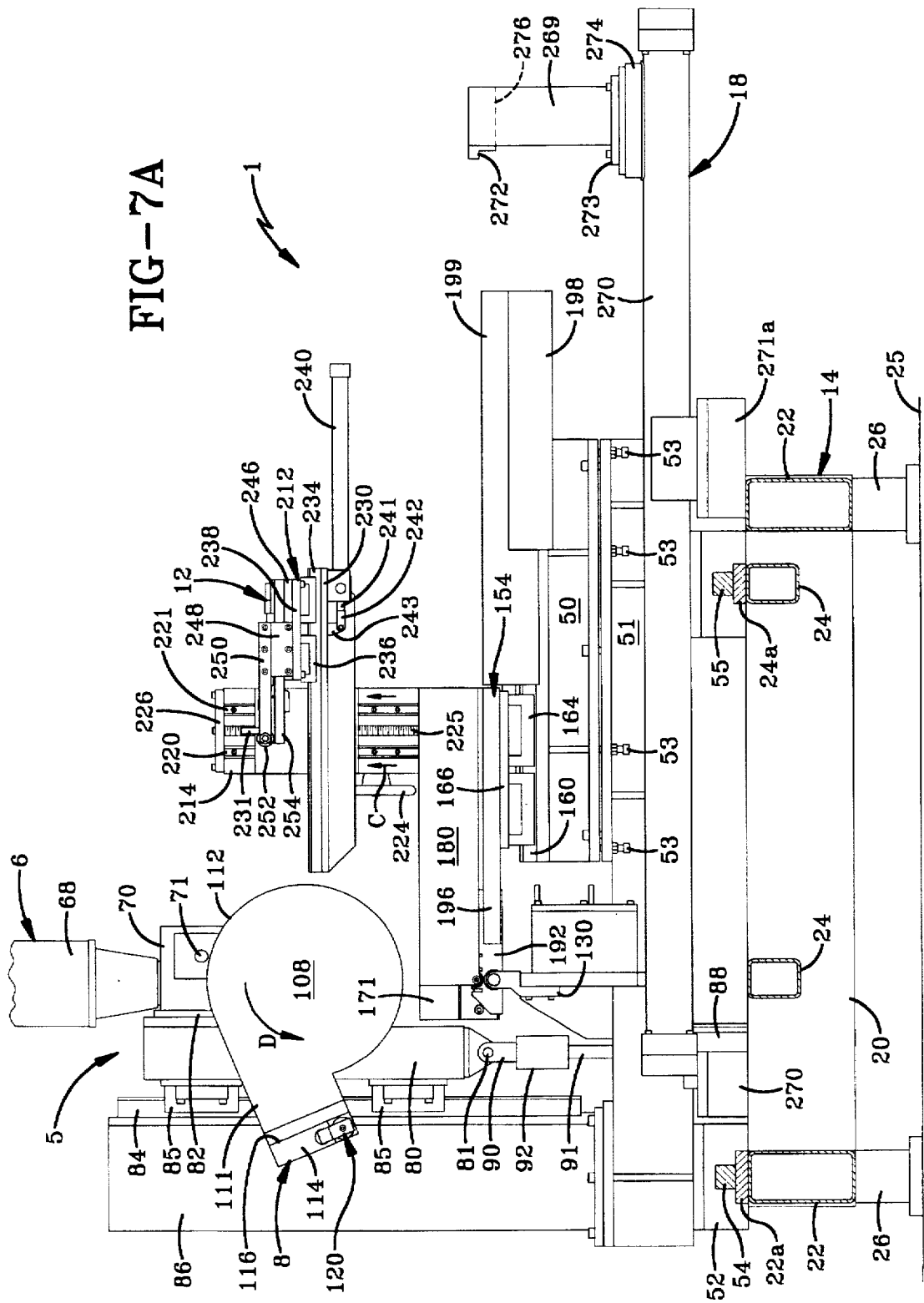

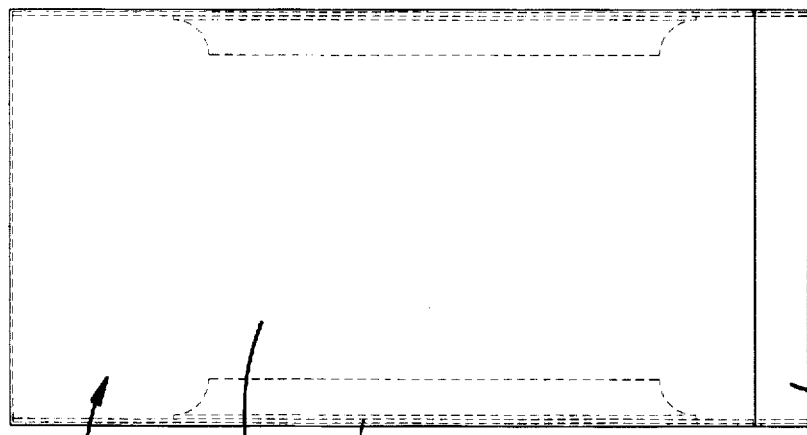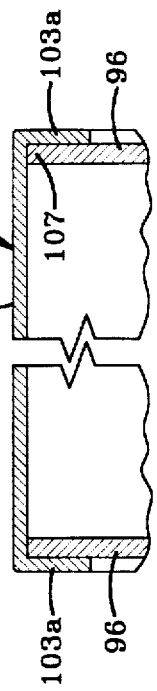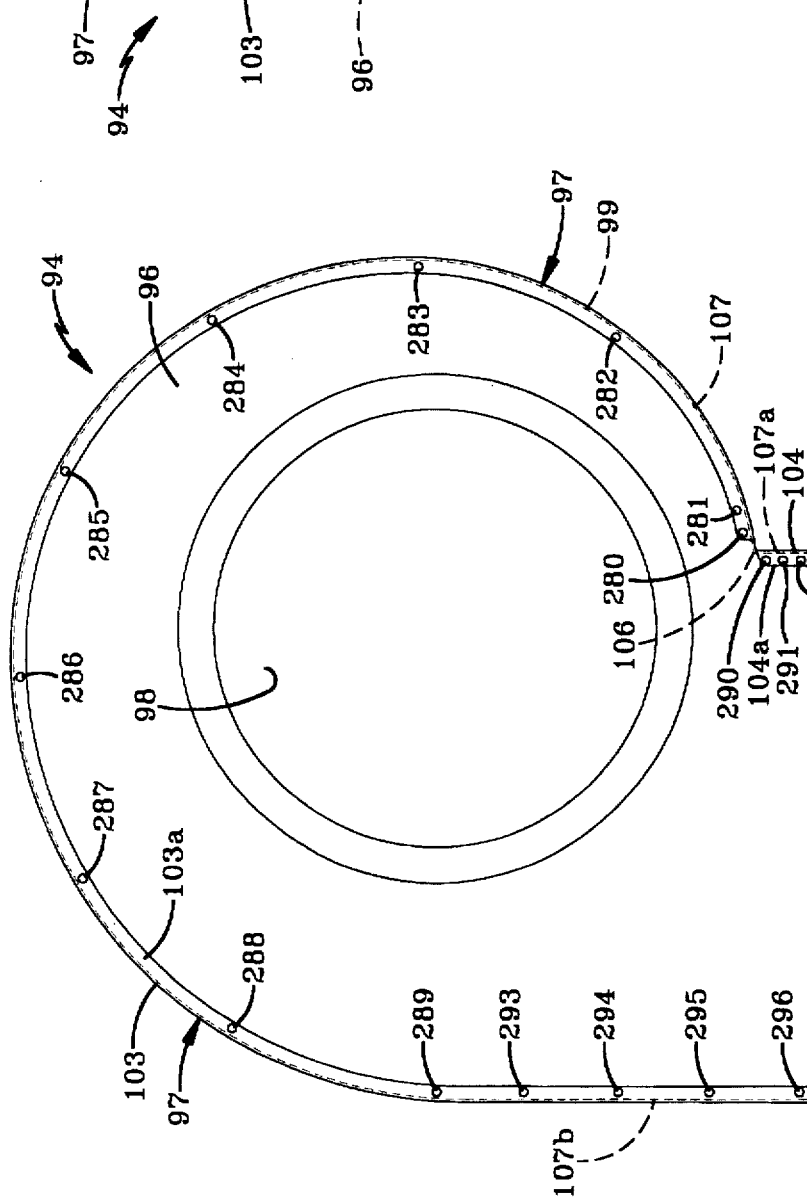

METHOD AND APPARATUS FOR FORMING BLOWER HOUSINGS

BACKGROUND OF THE INVENTION

1. Technical Field

The invention relates to an apparatus and method for forming a blower housing of the type used in air conditioning units, furnaces, and similar equipment. More particularly, the invention relates to an apparatus and method for forming a blower housing in which a wrap panel is welded around a pair of spaced-apart end panels. Even more particularly, the invention relates to an apparatus and method for forming a blower housing in which the end panels are rotated through a series of steps while a pair of stationary primary welders apply a plurality of spot welds around the circumference of the blower housing, thus attaching the end panels to the wrap panels, and in which the primary welders and a pair of secondary welders are index horizontally to apply additional spot welds to the linear sections of the blower housing.

2. Background Information

Blower housings are produced for a variety of applications, and usually will contain the blower motor and/or fan for mounting in a heating furnace or air conditioning unit, or other types of equipment in which a blower and fan are used for moving air in a system. These blower housings are currently formed by assembling a pair of end panels with a wrap panel and then joining the panels by a plurality of spot welds.

Conventional methods and apparatuses keep the end panels stationary while a wrapping mechanism wraps the wrap panel around the generally circular or spiral end panels. A welder moves along the circumference of the end panels and an operator applies spot welds from a work station. These methods and apparatuses are expensive to manufacture and have elaborate configurations because of the mechanisms required to move the welders in a circular direction. They require a large number of moving parts, such as the circular moving welding guns and the wrapping mechanism, which are subject to breakage and malfunctions.

Another method used to assemble the blower housings is to have an operator manually applying the welds with a hand-held welder. This method is time consuming and less effective because the operator is unable to consistently and accurately space the welds around the circumference of the blower housing. This can produce unevenly welded blower housings which, in turn, effects the quality, appearance and manufacturing cost of the blower housings.

Also, the wrapping mechanisms of the prior art apparatuses do not wrap the wrap panel tightly around the end panels, leaving gaps therebetween. The air being blown through the blower housing flows through these gaps decreasing the efficiency of the blower housing. A further problem is that the wrap panel must includes side flanges of at least ⅜ inches to give the operator enough material to manually apply the weld to the wrap panel and attach the wrap panel to the end panels.

Although these prior art methods and apparatuses were adequate for the purpose for which they were intended, the method and apparatus of the present invention improves upon these prior art methods and apparatuses by rotating the end panels rather than the welders. The rotational movement of the end panels tightly wraps the wrap panel around the circumference of the end panels producing a blower housing with no gaps and delivering a higher blower efficiency. By tightly wrapping the wrap panel around the end panel, the apparatus of the present invention is able to save material equating to one extra wrapper for approximately every fifty blower housings.

Further, the apparatus of the present invention uses a Programmable Logic Controller (PLC) to evenly space the welds around the circumference of the blower housing for maximum appearance and quality at a minimum cost. The PLC controls the primary and secondary welders and allows full control of the spacing between the welds, and it is programmable for matching different part requirements. The primary and secondary welders perform linear aligned welds to the linear section of the blower housing to complete the process. These welds are simple to accomplish by moving the welders horizontally along a plurality of guide rails. By controlling the welds using the PLC, each side flange of the wrap panel is reduced by approximately ¹⁄₁₆ inches. This equates to saving approximately ⅛ inches of material for each blower housing produced by the present invention. An operator is unable to consistently manually weld this short of a flange.

Therefore, the need exists for an improved method and apparatus for forming blower housings which rotates the end panels in unison, which wraps the wrap panel around the end panels while a pair of primary welders perform a plurality of spot welds around the circumference of the blower housing, and in which the primary welders and a pair of secondary welders only move horizontally along a plurality guide rails. There is no known apparatus or method of which we are aware which accomplishes these results.

SUMMARY OF THE INVENTION

Objectives of the invention include providing an improved apparatus and method for forming housings, and, in particular, blower housings, by rotating two end panels in unison which wraps a wrap panel around the end panels while a pair of primary welders remain stationary and apply a plurality of spot welds around the circumference of the blower housing.

A further objective of the invention is to provide such an apparatus and to apply spot welds to a first linear aligned lipped edge of the blower housing.

Another objective of the invention is to provide such an apparatus and method in which the primary welders move horizontally along guide rails to apply spot welds to a second linearly aligned section of the blower housing.

A still further objective of the invention is to provide such an apparatus and method in which the horizontal movement of the primary and the secondary welders along their respective guide rails requires a minimal amount of moving parts.

A further objective of the invention is to provide such an improved apparatus and method which enables various sizes of blower housings to be manufactured in the same apparatus utilizing the same method by making minor adjustments to various components of the apparatus.

Still another objective of the invention is to provide such a method and apparatus which welds the two end panels to the wrap panel in an automated process.

A further objective of the invention is to provide such an apparatus and method which utilizes various standard components such as hydraulic and pneumatic cylinders, guide rails and welders, all of which are arranged in a unique combination to achieve the advantages of the apparatus and method, with usual programmable control equipment, enabling a single operator to load the machine with the end panels and wrap panel, and then actuate an automatic sequence of operation.

A still further objective of the invention is to provide such an apparatus and method which may be provided with an unload mechanism which removes the formed blower housing automatically from the apparatus, and places it on a conveyor or skid for movement to a storage or transportation site.

Another objective of the invention is to provide such an apparatus and method which tightly wraps or scrolls the wrap panel around the end panels to gaps therebetween; and which evenly spaces the welds around the end panel to consistently form a blower housing of a maximum quality and appearance.

These objectives and advantages are obtained by the apparatus of the present invention, the general nature of which may be stated as including apparatus for forming a metal housing, having a base; a pair of work-holding subassemblies rotatably mounted on the base for holding the end panels in a position for assembly to the wrap panel to form the housing; rotating means for rotating the work-holding subassemblies between a plurality of weld positions; and welding means for welding the end panels to the wrap panel.

These objectives and advantages are obtained further by the improved method of the present invention for forming a metal housing having a pair of spaced end panels and intervening wrap panels connected to the end panels by a plurality of welds, wherein said method includes the steps of placing the wrap panel on a work holder subassembly; clamping a pair of the end panels adjacent the wrap panel in a predetermined spaced relationship on the work holder subassembly; moving a pair of primary welder subassemblies in a first linear path into engagement with the wrap panel and end panels at a first welded position; securing the wrap panel to the end panels at a first weld position by actuating the primary welder subassemblies; rotating the end panels to a second weld position scrolling the wrap panel around said end panels; moving the primary welder subassemblies in said first linear path back into engagement with the wrap panel and end panels; further securing the end panels to the wrap panel at the second weld position by actuating the primary welder subassemblies; rotating the end panels and wrap panel to additional positions and moving the primary welder subassemblies in said first linear path back into engagement with the end panels and wrap panel at each of said additional weld positions; further securing the end panels to the wrap panel at said additional weld positions by actuating the primary welder subassemblies; and then removing the metal housing from the work holder subassembly after securing the end panels to the wrap panel at the last of said additional weld positions.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 7A is a sectional view similar to FIG. 7 showing the apparatus in a home position;

FIG. 27 is a side elevational view of the blower housing assembled by the apparatus;

FIG. 28 is a rear elevational view of the blower housing of FIG. 27; and

FIG. 29 is a greatly enlarged fragmentary sectional view of the blower housing of FIG. 27.

Similar numerals refer to similar parts throughout the drawings.

DESCRIPTION OF THE PREFERRED EMBODIMENT

Figure 1:
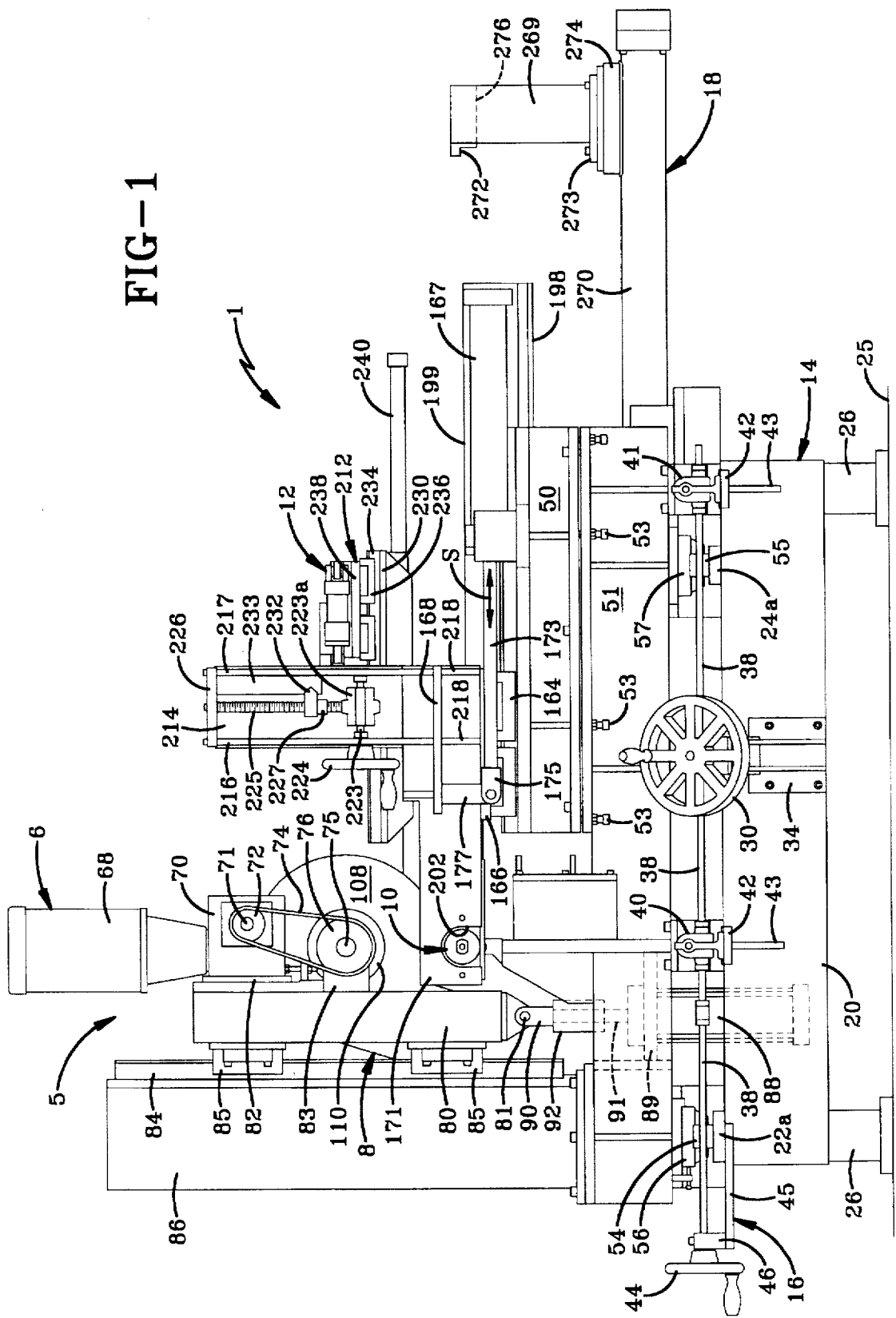
FIG. 1 is a side elevational view of the apparatus of the present invention for manufacturing blower housings.

The apparatus for manufacturing blower housings of the present invention is shown particularly in FIGS. 1–3, 5 and 5A, and is indicated generally at 1. Apparatus 1 has an adjustable right side 2 (FIGS. 2, 3, 5 and 5A) generally similar to a stationary left side 4. Right side 2 and left side 4 generally include a column assembly indicated generally at 5 which consists of a motor subassembly 6 (FIGS. 1, 3–5A) and a work-holding subassembly 8 (FIGS. 2, 5 and 7), a primary welder subassembly 10 (FIGS. 1, 3, 4 and 5) and a secondary welder subassembly 12 (FIGS. 1–3, 6 and 7), all of which are mounted on a base 14. Apparatus 1 further includes a width adjustment subassembly 16 (FIGS. 1–3, 5–6) and a wrap panel advancing subassembly 18 (FIGS. 1, 2 and 7) also mounted on base 14.

Base 14 consists of a plurality of horizontal beams 20 (FIGS. 1 and 3–7) which extend from the front to the rear of base 14, a plurality of horizontal beams 22 (FIGS. 2–7) which extend between beams 20, and a pair of intermediate horizontal auxiliary beams 24 (FIG. 2, 4 and 7) which extend parallel to beams 22 and between beams 20. Beams 20, 22 and 24 are supported above a horizontal support surface 25 by a plurality of vertically extending corner legs 26 which preferably are formed of a rectangular-shaped metal tubing.

Figure 2:
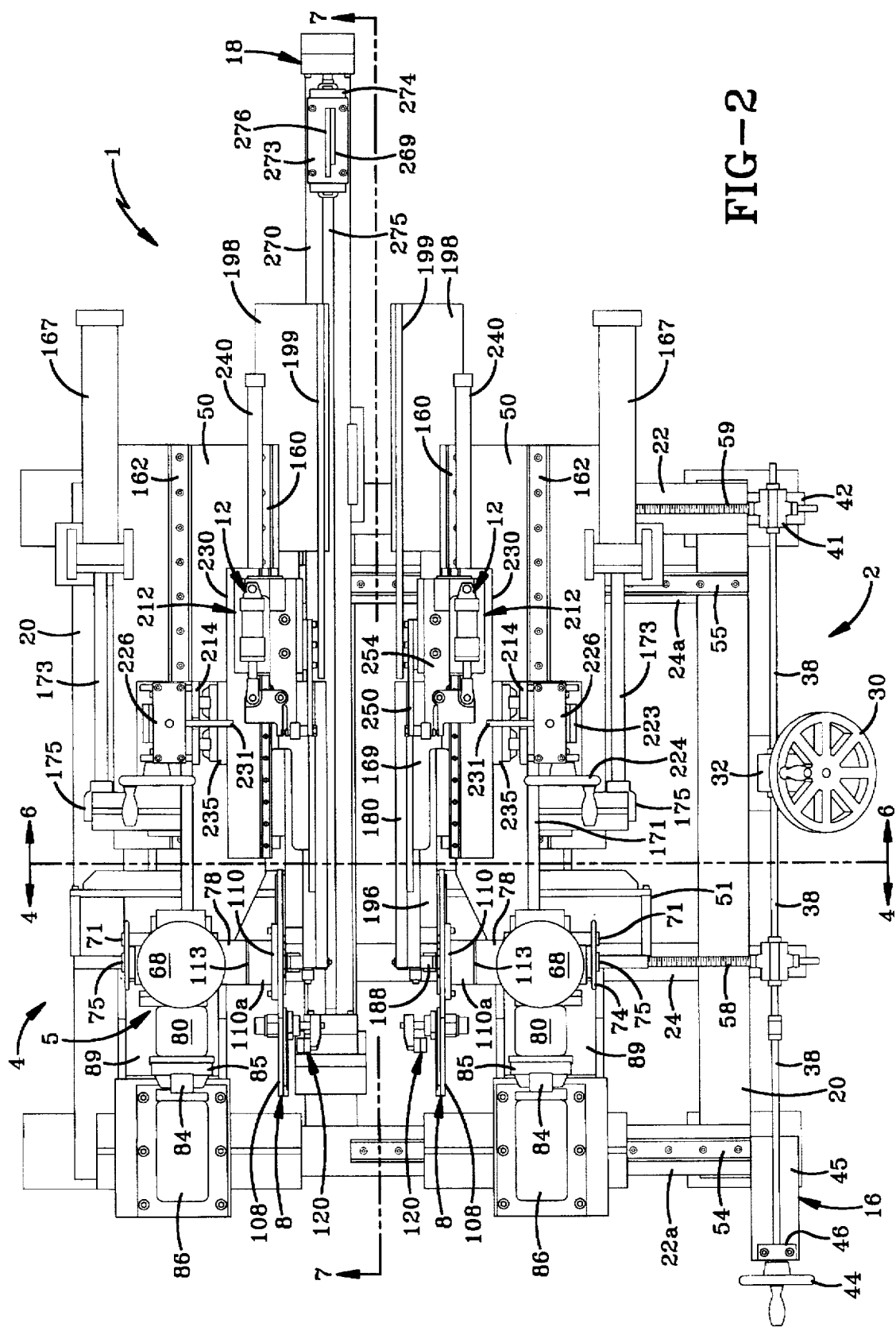
FIG. 2 is a top plan view of the apparatus of FIG. 1.
Figure 3:
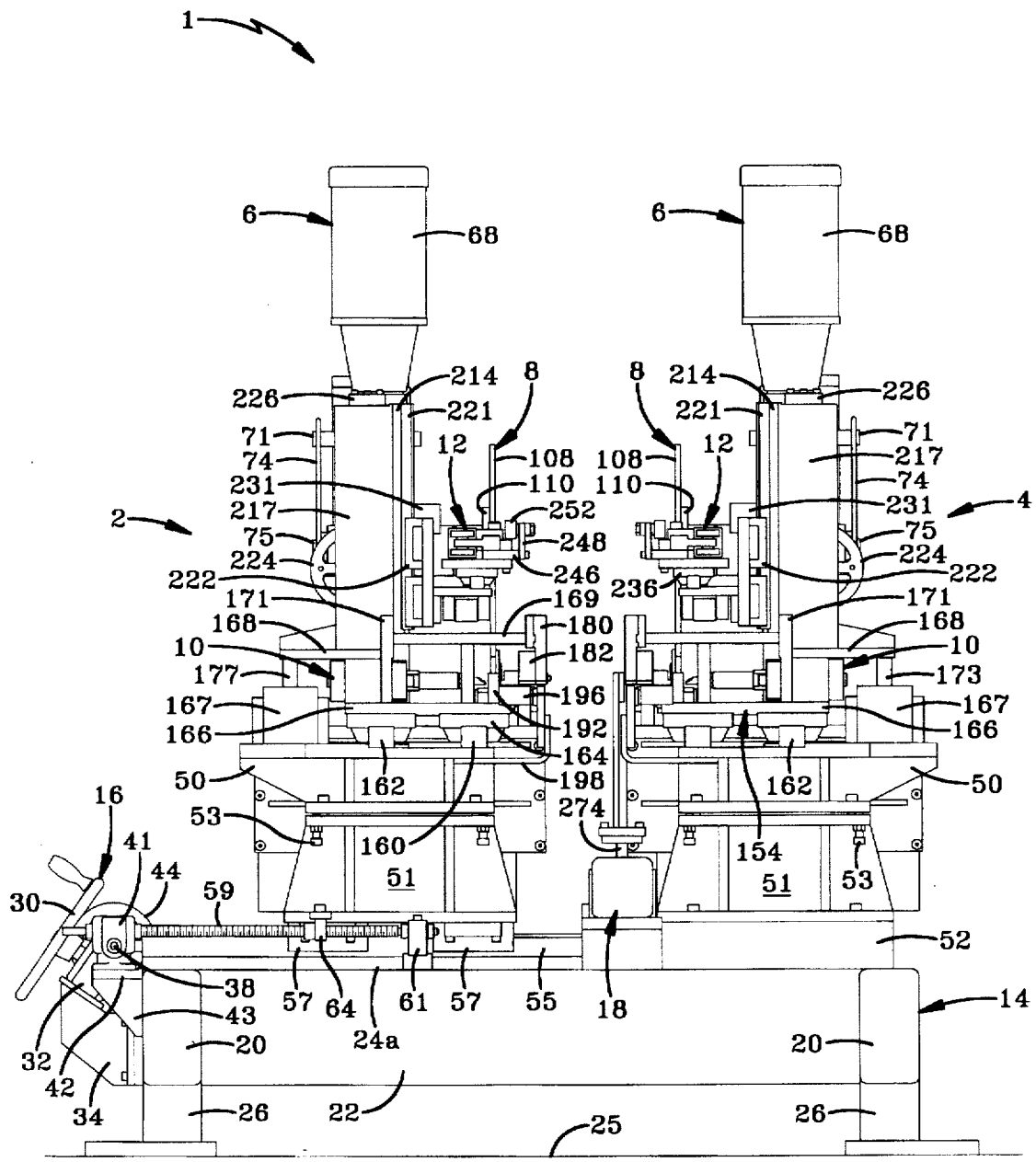
FIG. 3 is a rear elevational view of the apparatus of FIG. 1.
Figure 5:
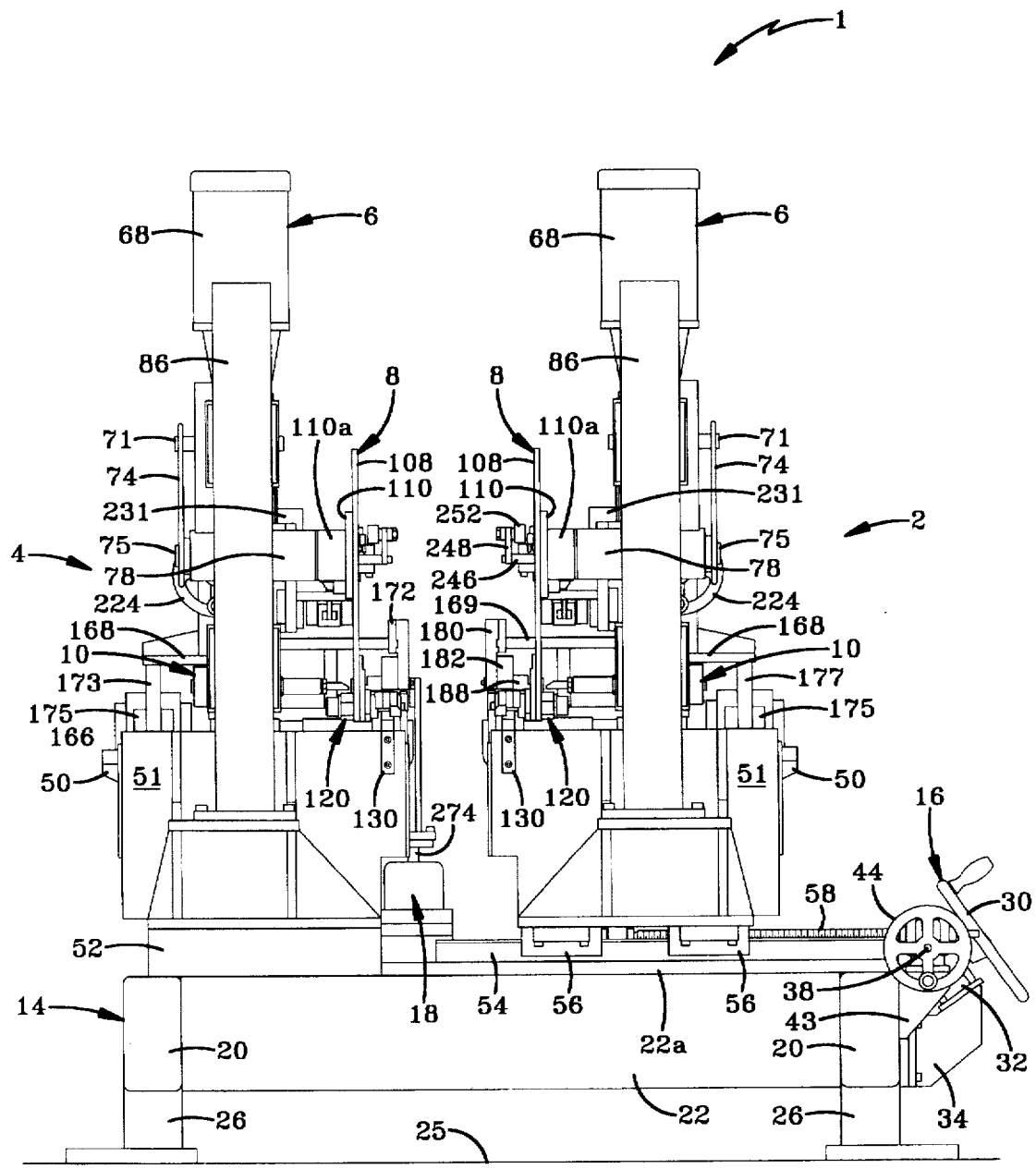
FIG. 5 is a front elevational view of the apparatus of FIG. 1.
Figure 5A:
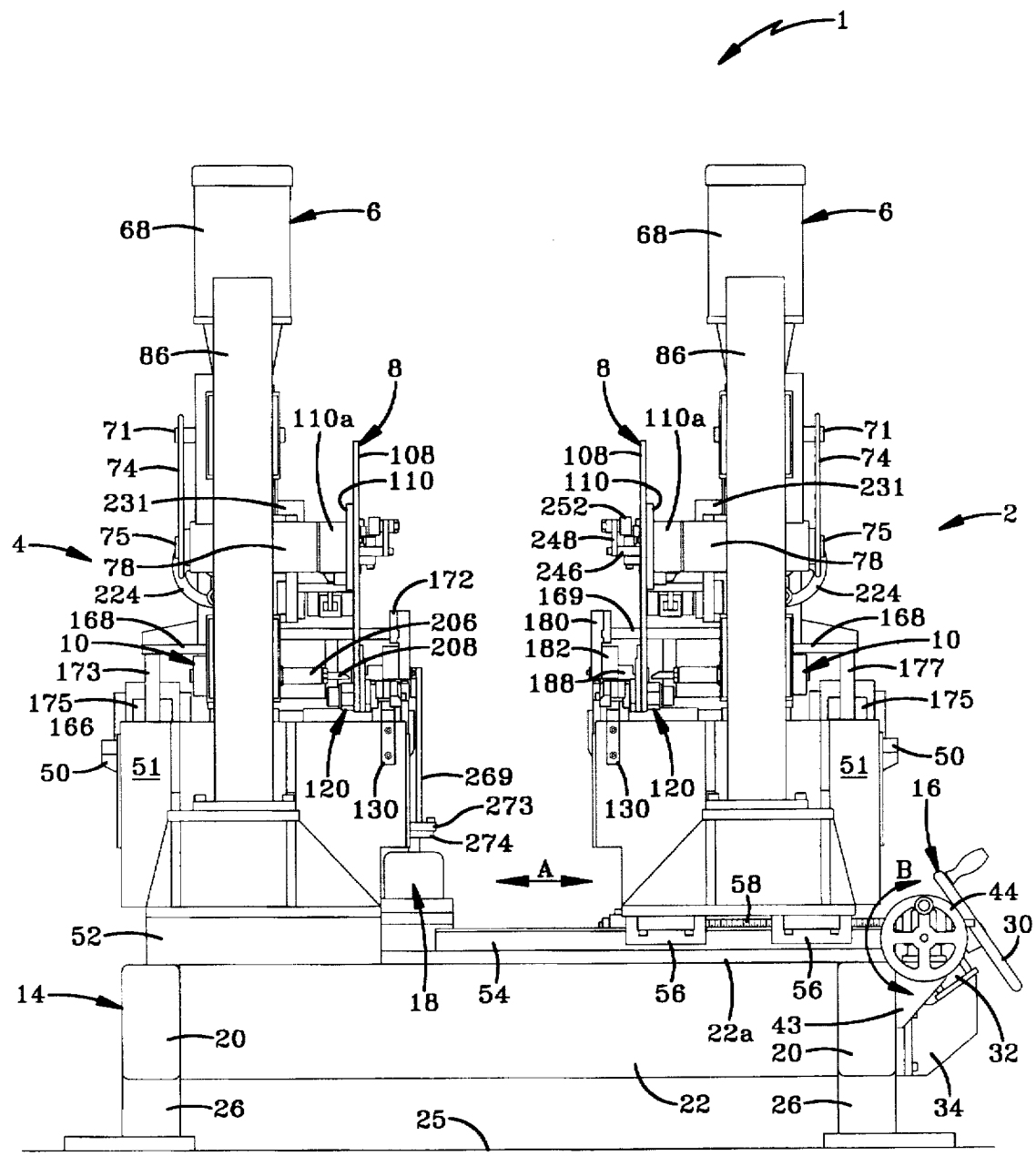
FIG. 5A is a view similar to FIG. 5 showing one side of the apparatus in a outwardly adjusted position.
Figure 6:
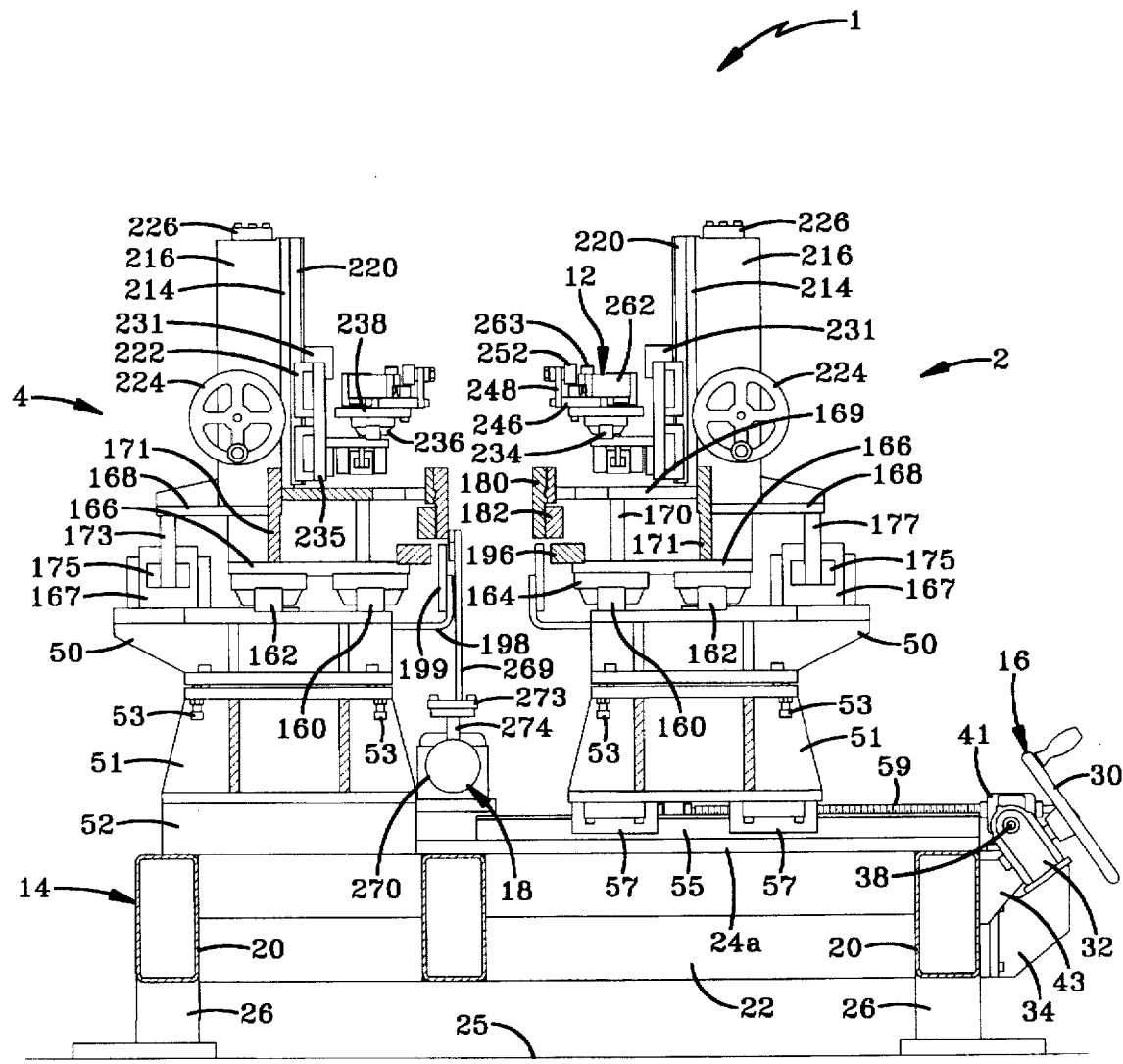
FIG. 6 is a sectional view taken along line 6—6, FIG. 2.

Referring to FIG. 1, width adjustment subassembly 16 is mounted to one of the beams 20, which is the right-hand beam as shown in FIG. 5, to horizontally adjust right side 2 toward and away from the fixed left side 4. Width adjustment subassembly 16 includes a course adjustment hand wheel 30 which extends from a gear box 32 (FIGS. 2, 3 and 6). A mounting bracket 34 (FIGS. 1, 3, 5 and 5A) mounts course adjustment wheel 30 and gear box 32 to right beam 20. An adjustment rod 38 extends from each side of gear box 32 and connects to front and rear gear boxes 40 and 41 respectively. A pair of horizontally extending mounting brackets 42 with triangular support flanges 43, mount gear boxes 40 and 41 to right beam 20. Adjustment rod 38 further extends from front gear box 40 forward to a fine tuning adjustment hand wheel 44.

Fine tuning adjustment wheel 44 extends from a front edge of right beam 20 and is mounted thereto by a horizontally extending mounting bracket 45 and a vertically extending mounting bracket 46. An indicator and scale (not shown) may be attached to right side 2 and base 14, respectively, to assist an operator in precisely adjusting the distance or spacing between right side 2 and left side 4.

Right side 2 and left side 4 of apparatus 1 each includes a top support block 50 mounted on a bottom support block 51 (FIGS. 1, 3, 5 and 6). Bottom support block 51 of stationary left side 4 is mounted to a spacer block 52 which, in turn, is mounted to base 14. A plurality of leveling screws 53 adjust top support blocks 50 to a level position on bottom support block 51 to account for slightly uneven support surfaces 25.

Figure 4:
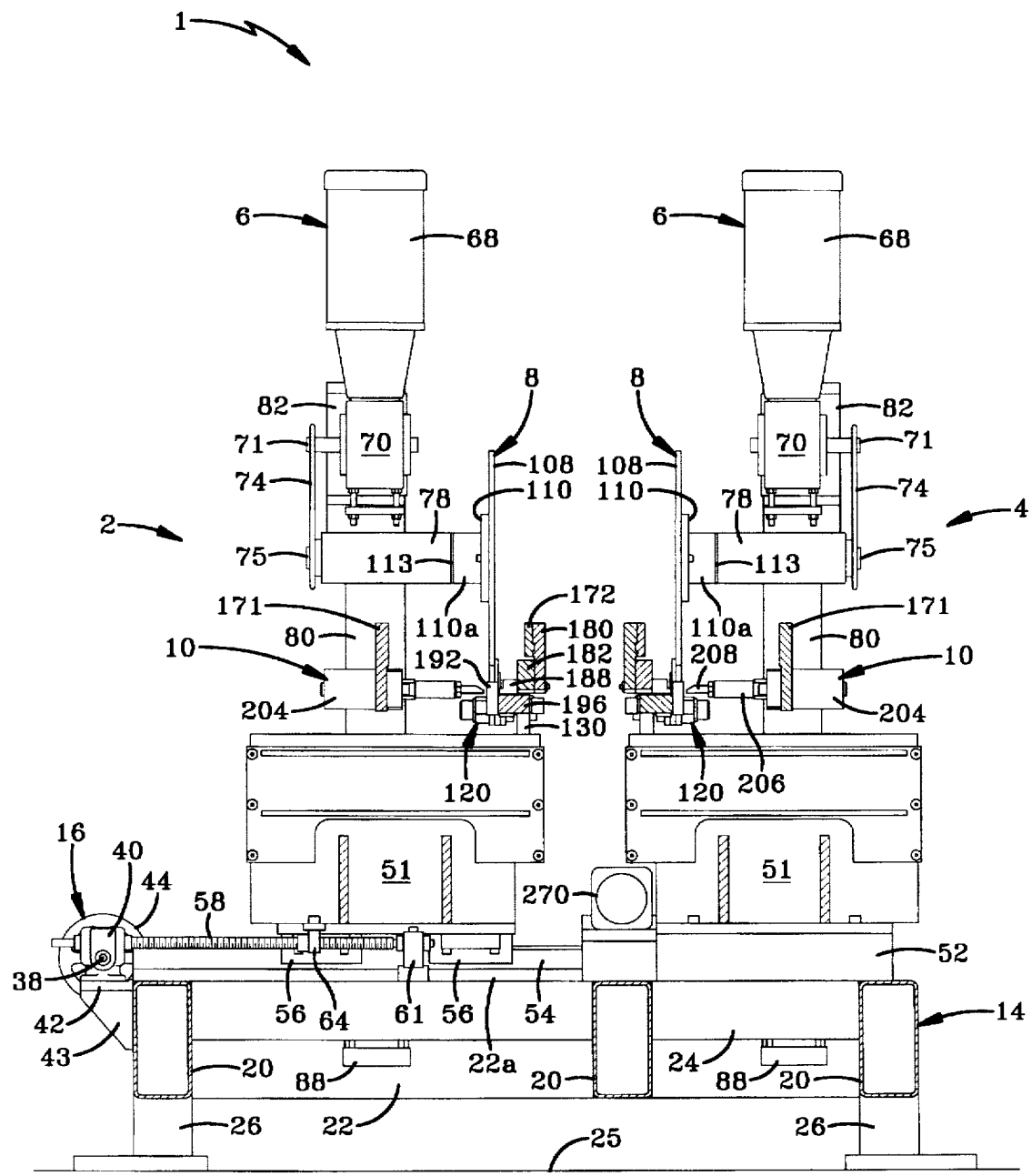
FIG. 4 is a sectional view taken along line 4—4, FIG. 2.

A pair of front and rear guide rails 54 and 55, respectively, extend horizontally along and partially across front horizontal beam 22 and rear auxiliary beam 24, respectively, and are supported thereon by a pair of spacer blocks 22a and 24a, respectively. A pair of slide blocks 56 (FIGS. 1, 3–5) engage guide rail 54 and a pair of slide blocks 57 (FIGS. 1, 3 and 6) engage guide rail 55 to slidably movably mount bottom support block 51 of adjustable right side 2 to base 14. A pair of threaded leadscrews 58 and 59 (FIG. 2) extend across front auxiliary beam 24 and rear horizontal beam 22, respectively, and are attached at a first end to gear boxes 40 and 41, respectively, and at a second end to a pair of bearing supports 61 (FIGS. 3, 4 and 5A). A pair of follower nuts 64 extend from a bottom surface of bottom support block 51 of right side 2 and threadably engage leadscrews 58 and 59 to facilitate the sliding movement of right side 2 along guide rails 54 and 55 upon rotation of hand wheels 30 and 44.

Figure 7:
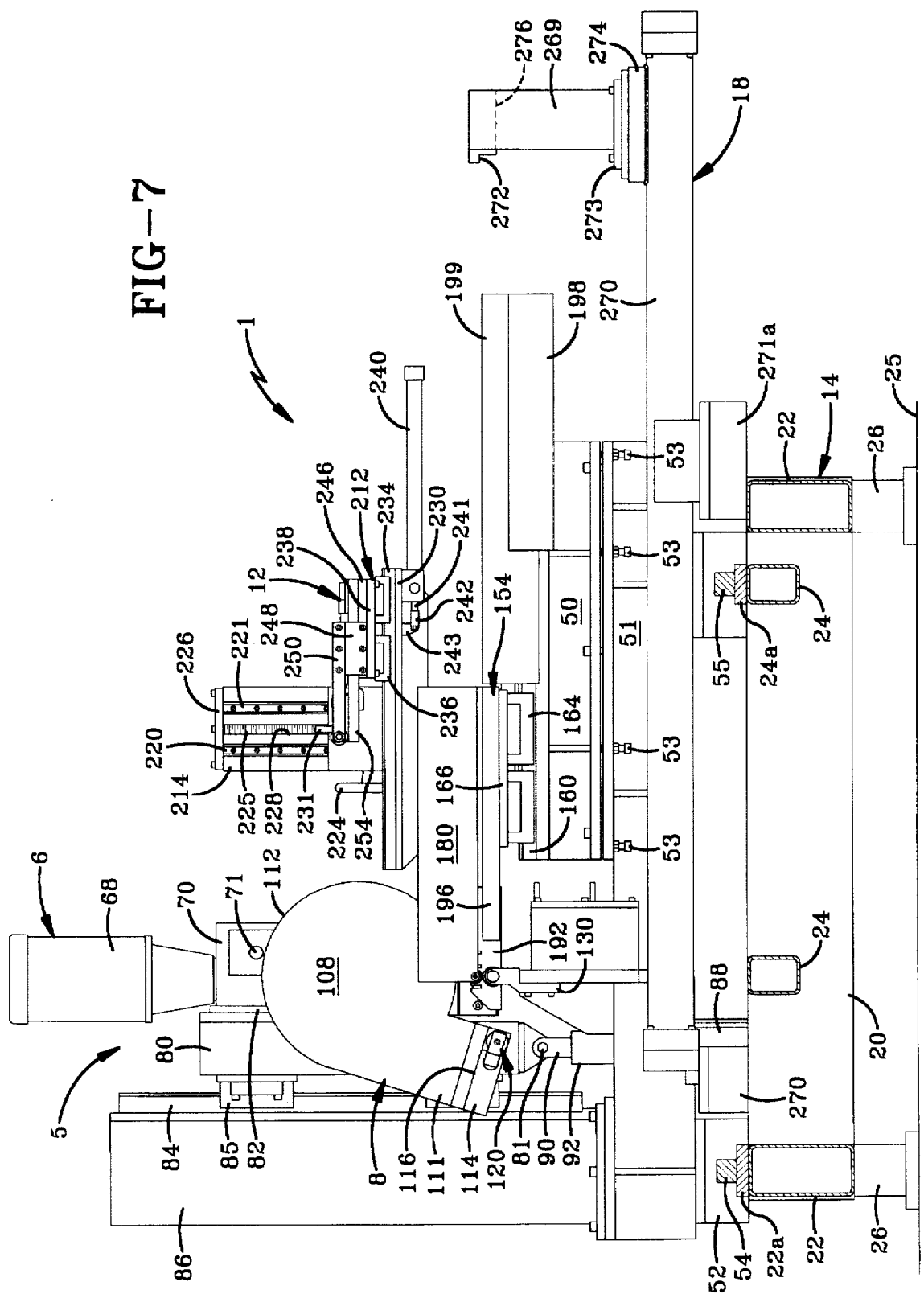
FIG. 7 is a sectional view taken along line 7—7, FIG. 2.

Right side 2 is generally similar to left side 4, as previously mentioned, and therefore, only one side will be described in detail. In accordance with one the features of the invention, motor subassembly 6 of column assembly 5 includes an overhead motor 68 which extends vertically upwardly from a gear box 70 (FIGS. 1, 4 and 7). Gear box 70 rotates a drive shaft 71 which has a small sprocket 72 attached thereto. Small sprocket 72 uses a chain 74 to drive a large sprocket 76 which, in turn, drives a second drive shaft 75. Second drive shaft 75 extends into a cylindrical housing 78 (FIG. 2) and attaches on its inner end to work-holding subassembly 8.

Gear box 70 and cylindrical housing 78 are mounted to a vertically extending column 80 by a pair of mounting brackets 82 and 83, respectively (FIG. 1). Column 80 is slidably movably mounted on a vertically extending guide rail 84 by a pair of slide blocks 85. Guide rail 84 is attached to a vertically upright frame 86 which is bolted to bottom support block 51. A counter-balancing holddown air cylinder 88 is mounted to bottom support block 51 by a mounting plate 89 (FIGS. 1 and 2). Holddown cylinder 88 includes a piston rod 91, a clevis 90 which connects cylinder 88 to column 80 with a pin 81. A rubber sleeve or urethane cushion 92 extends around piston rod 91 to cushion the downward movement of clevis 90, and is cut vertically along its height to allow rubber sleeve 92 to be easily changed for setups on different sized parts.

The blower housing to be produced by apparatus 1 is indicated generally at 94, and is shown particularly in FIGS. 27–29. Housing 94 includes a pair of similar end panels 96 and a wrap panel 97. The particular configuration of panels 96 and 97 may vary from that shown in the drawings and described below without affecting the concept of the invention. The particular end panels of the preferred embodiment are formed with a central opening 98, an outer edge 99 and a straight edge 100. Outer edge 99 includes a spiral-shaped section 107 which extends between short and long straight sections 107a and 107b, respectively. Straight edge 100 joins sections 107a and 107b at corners 101 and 102, respectively, and a notch 106 is formed between straight section 107a and spiral-shaped section 107. Wrap panel 97 consists of an elongated flat section 103 with corresponding upwardly extending side flanges 103a, and a downwardly extending lip 104 at one end thereof (FIG. 8) with corresponding side flanges 104a (FIG. 27).

In accordance with another feature of the invention, work-holding subassembly 8 holds end panel 96 for subsequent assembly to wrap panel 97. Work-holding subassembly 8 includes an end panel plate 108 (FIGS. 7 and 7A) which is similar in shape and size to end panels 96, and is mounted to a mounting plate 110 (FIGS. 2 and 4). Mounting plate 110 is attached to a cylindrical spindle 110a. Spindle 110a is coaxially aligned with cylindrical housing 78 and is rotated by second drive shaft 75. A bearing plate 113 is positioned between spindle 110a and cylindrical housing 78 to assist in the rotational movement of spindle 110a mounting plate 110 and end panel plate 108.

End panel plate 108 has an outwardly extending first portion 111 (FIG. 7), an edge of which is formed tangent to a circular second portion 112. A clamping plate 114 (FIGS.

7 and 10) is attached to the outer end of first portion 111 of end plate panel 108. Clamping plate 114 is formed with a ledge 116 on an outer surface thereof and a square raised section 118 is formed below ledge 116 adjacent a rear edge of first portion 111.

Figure 10:
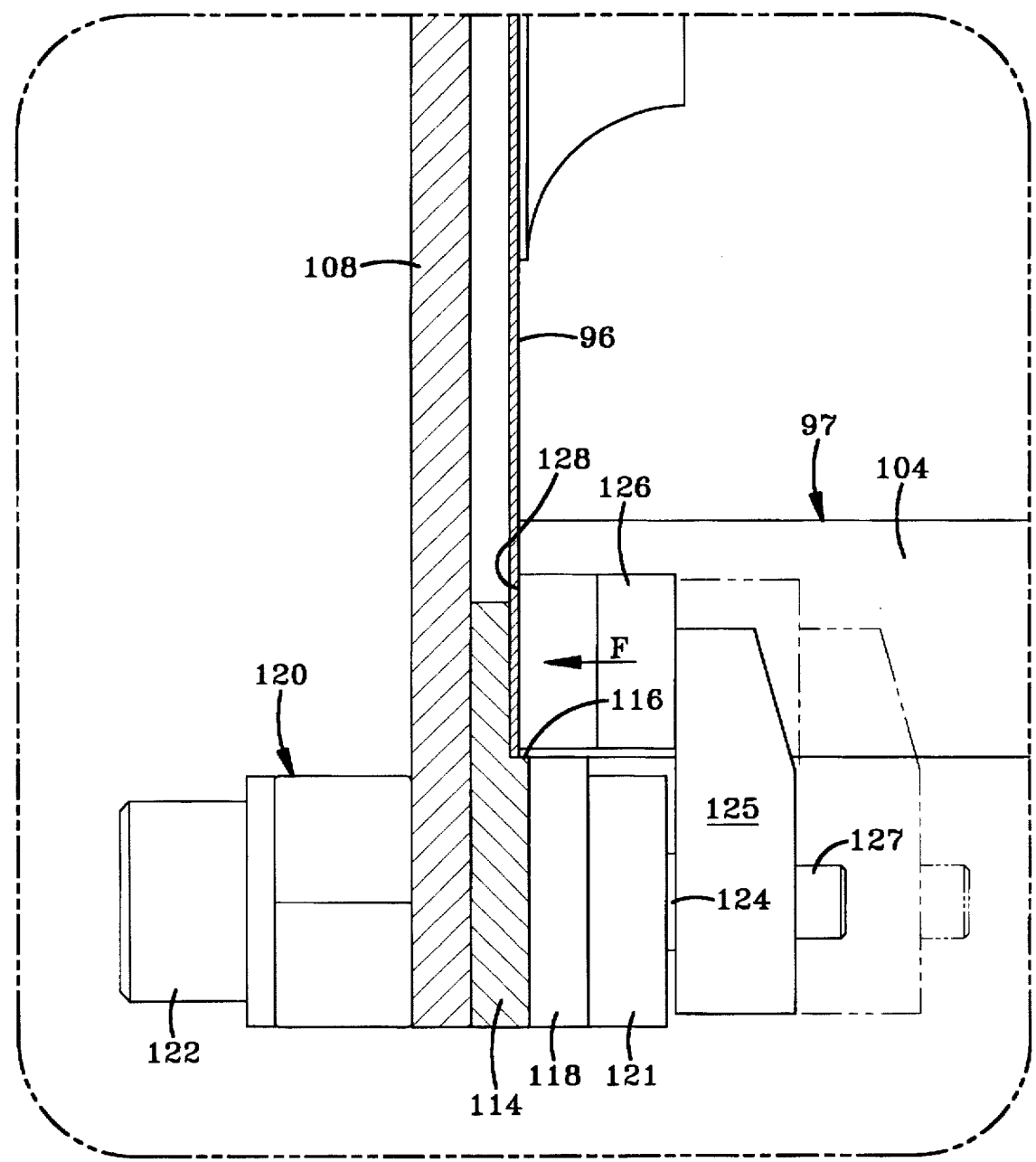
FIG. 10 is a greatly enlarged fragmentary sectional view showing a clamping mechanism holding the end panels.

A pressure actuated clamping mechanism 120, shown particularly in FIG. 10, is mounted to end panel plate 108 for securing end panel 96 to plates 108 and 114. Clamping mechanism 120 has a circular bushing 121 which sits adjacent to raised section 118 of clamping plate 114. A pressurized cylinder 122 is attached to an outside surface of end panel plate 108 and includes a piston rod 124 which extends through aligned openings formed in plates 108 and 114, block 118 and bushing 121. A pivotal clamping arm 125 is attached to an inner end piston rod 124 by a bolt 127. Clamping arm 125 has a pawl 126 which extends toward end panel plate 108 and which has a jagged clamping surface 128.

In accordance with another feature of the invention, each side 2 and 4 includes a stationary primary welder 10 and secondary welder 12 which are supported on a lower carriage subassembly 154 (FIG. 3). Each lower carriage 154 includes a lower shelf 166, an outer intermediate shelf 168 and an upper shelf 169. Lower carriage subassembly 154 is slidably mounted on a pair of inner and outer guide rails 160 and 162 (FIGS. 2, 3 and 6), respectively. Guide rails 160 and 162 are mounted on an upper surface of top support block 50 and are engaged by a pair of slide blocks 164. Slide blocks 164 are mounted to a bottom surface of lower shelf 166.

A pair of inner and outer upright spaced parallel supports 170 and 171, respectively, extend vertically from lower shelf 166 (FIGS. 3 and 6). Intermediate shelf 168 extends outwardly from an outer surface of vertical support 171 and upper shelf 169 extends between vertical supports 170 and 171.

A main pressure actuated pneumatic cylinder 167 (FIGS. 1 and 2) is mounted in a fixed position to top support block 50 and includes a piston rod 173 (FIG. 1) with a clevis 175 connected to a free end thereof. Clevis 175 connects piston rod 173 to an arm 177 which extends downwardly from an outer front edge of intermediate shelf 168. Main cylinder 167 extends and retracts piston rod 173 to slide lower carriage 154 on guide rails 160 and 162 as shown by arrow S, FIGS. 22–25.

Figure 8:
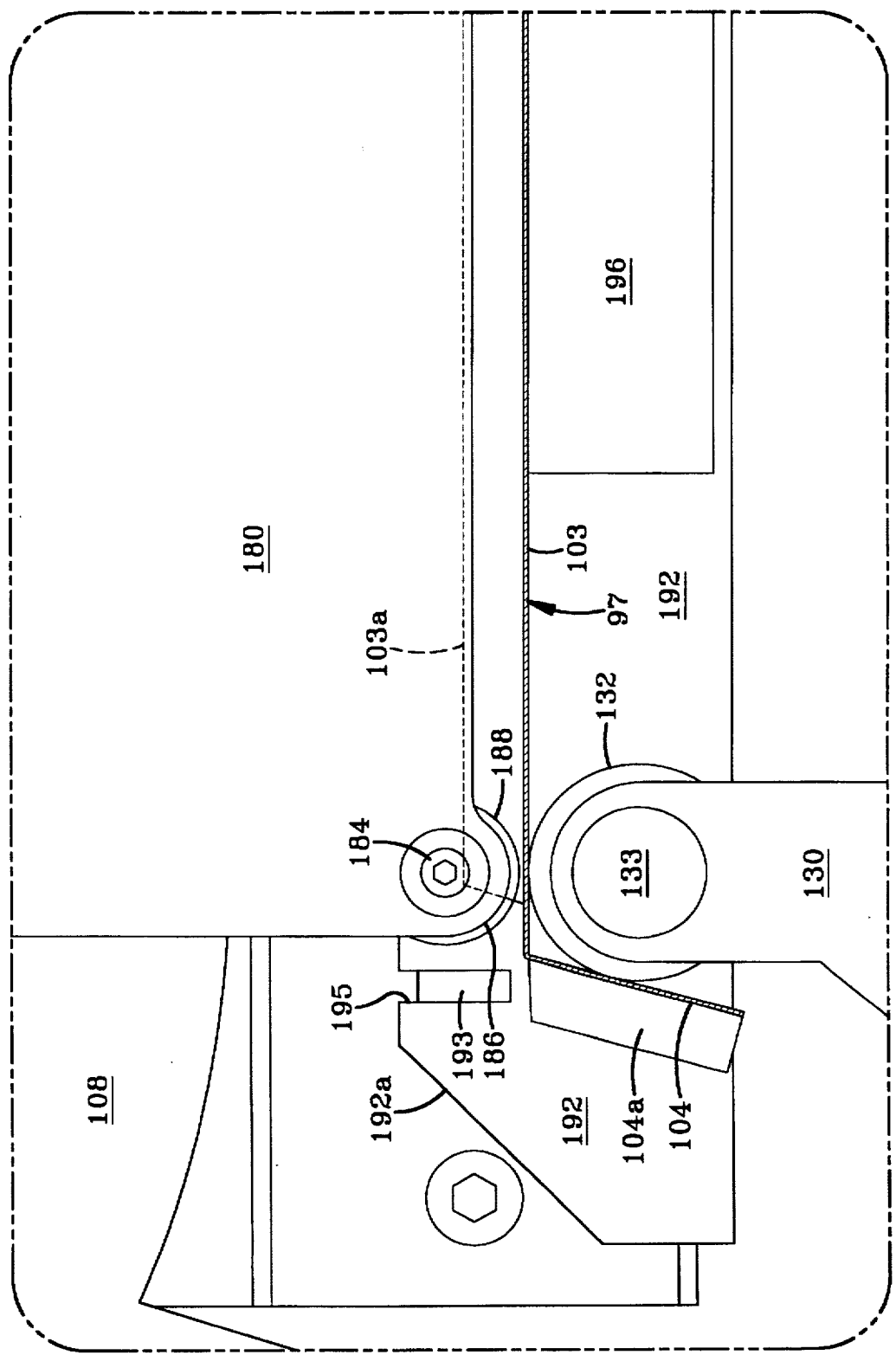
FIG. 8 is a greatly enlarged fragmentary view of a portion of FIG. 7 showing the wrap panel being held by the apparatus.
Figure 12:
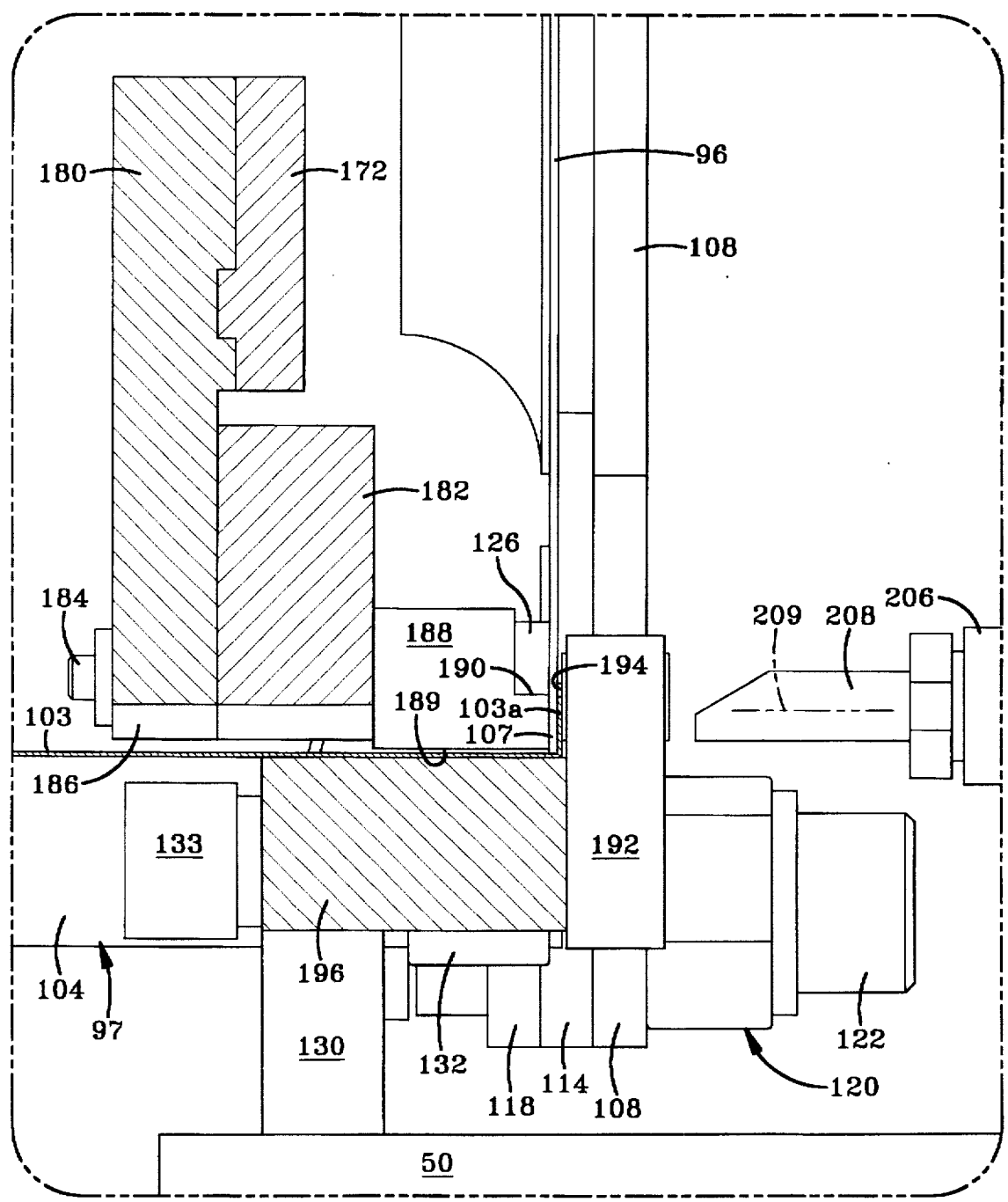
FIG. 12 is a greatly enlarged fragmentary sectional view showing an end panel and the wrap panels prior to being welded by a primary welder subassembly.

A brace 172 (FIGS. 5, 6, 12 and 13) extends vertically from an inner edge of upper shelf 169 and braces a first upper support plate 180 (FIG. 12) in an upright position. A second upper support plate 182 is fastened to first support plate 180. First and second support plates 180 and 182, respectively, extend horizontally forward and have a radially curved front bottom corner 186 (FIGS. 8 and 12).

An upright roller bracket 130 is bolted to a front surface of bottom support block 51 and rotatably supports a roller 132 (FIGS. 8, 9, 12 and 13). Roller 132 extends from bracket 130 and is held thereon by a bushing 133. Bushing 133 mounts to bracket 130 and is counter-bored to receive a shoulder bolt 134. Bracket 130 is formed with a hole 135 which has a bearing ring 136 therein. Shoulder bolt 134 extends through bushing 134 and bearing ring 136, and threadably engages roller 132 to facilitate the rotational movement of roller 132 and bushing 133. A cylindrical head 188 is attached to a front bottom corner of support plates 180 and 182 by bolt and washer assembly 184. Head 188 is positioned above roller 132 forming a gap 189 therebetween, and has an outwardly extending flat lower section 190.

A side bar 192 extends adjacent the outer edge of head 188 forming a gap 194 therebetween. Side bar 192 extends horizontally rearwardly parallel to support plates 180 and 182 and has a tapered top edge 192a (FIG. 8). A mounting bar 196 (FIG. 4) mounts side bar 192 to the top inner surface of lower shelf 166. A plurality of slots 195 (FIG. 8) are formed transversely in side bar 192 to allow an equal number of rollers 193 to project out the sides of side bar 192. Rollers 193 facilitate a horizontal sliding movement of end panel 96 and wrap panel 97 during the assembly of blower housing 94, as described below in further detail.

An inwardly upwardly extending L-shaped extension bracket 198 (FIGS. 7 and 7A) is mounted at a rear of top support block 50 and extends along an inner edge thereof. A support board 199 is mounted to an outer edge of the upwardly extending portion of extension 198. Support board 199 is located adjacent to a rear end of mounting block 196 (FIGS. 7 and 7A). Support board 199 is slightly offset from mounting block 196 and the top edges of board 199 and block 196 lie in a common horizontal plane.

Each primary welder subassembly 10 is bolted to vertically extending support 171 (FIG. 1) and extends through an inverted U-shaped opening 202 formed in support 171. Each primary welder subassembly 10 includes a welding gun 204 (FIG. 4), a welding arm 206 which extends inwardly from gun 204, and has an extendible welding tip 208. Welding tips 208 of each primary welder subassembly 10 extend in a linear path 209 (FIG. 12) and move toward and away from each other in a first common plane. Primary welder subassembly 10 is positioned adjacent to an outer surface of side bar 192 opposite head 188. A hole 210 is formed in side bar 192 (FIG. 13) and is aligned coaxially with primary welder subassembly 10 to permit welding tip 208 to extend therethrough and apply a weld to end plate 96 and wrap panel 97 as described below in further detail.

Figure 11:
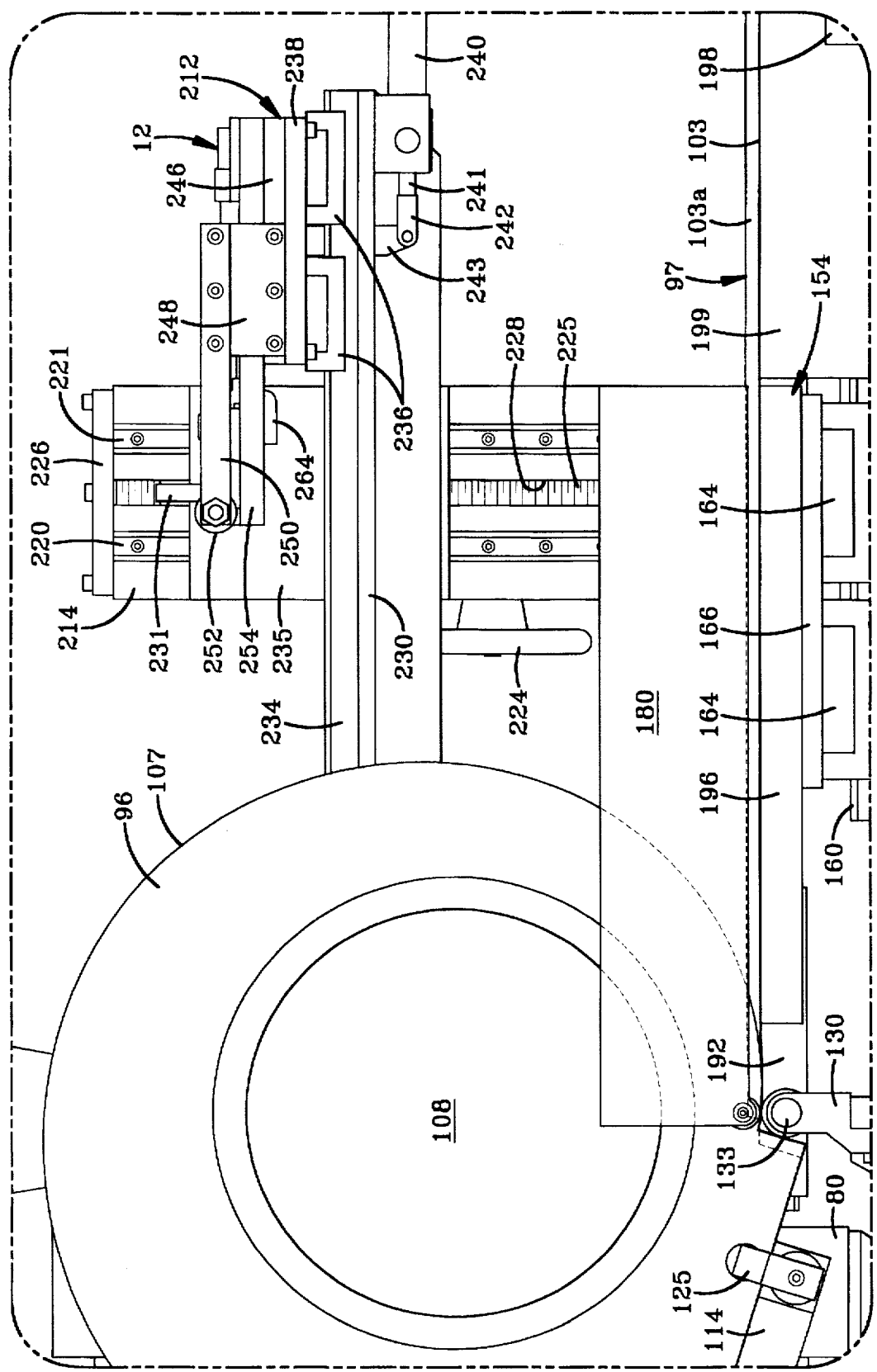
FIG. 11 is an enlarged fragmentary view of a portion of FIG. 7 showing a secondary welder subassembly and showing the end panels and wrap panel in a first weld stage position.

Each secondary welder subassembly 12 is movably mounted on an upper carriage assembly 212 (FIGS. 1, 7 and 11). Upper carriage assembly 212 is supported on a vertical support wall 214 which extends upwardly from upper shelf 169. Support wall 214 is formed with a slotted opening 228 (FIG. 11) and has front and rear side walls 216 and 217, respectively which extend along the entire length of support wall 214 and extend downwardly to intermediate shelf 168. A pair gussets 218 (FIG. 1) extend between intermediate shelf 168 and lower shelf 166 and are aligned with side walls 216 and 217 to further support intermediate shelf 168 above lower shelf 166.

A pair of guide rails 220 and 221 extend vertically on an inner surface of support wall 214. A pair of slide blocks 222 engage guide rails 220 and 221 for vertically moving secondary welder subassembly 12. A secondary adjustment wheel 224 is attached to a first end of an axle 223. Axle 223 extends through front side wall 216 and connects to a gear box 223a and extends to rear side wall 217. A leadscrew 225 extends vertically from gear box 223a and is secured at its top end to a plate 226. A follower nut 227 threadably engages leadscrew 225 and includes an indicator 232 which indicates the height of upper carriage assembly 212 on a scale 233. A bracket 231 (FIGS. 2 and 11) is welded to the inner surface of follower nut 227 and extends through slotted opening 228. Bracket 231 extends perpendicular to support wall 214 and is attached to a vertical support plate 235. A support shelf 230 extends horizontally inwardly from plate 235 to support upper carriage 212.

Figure 18:
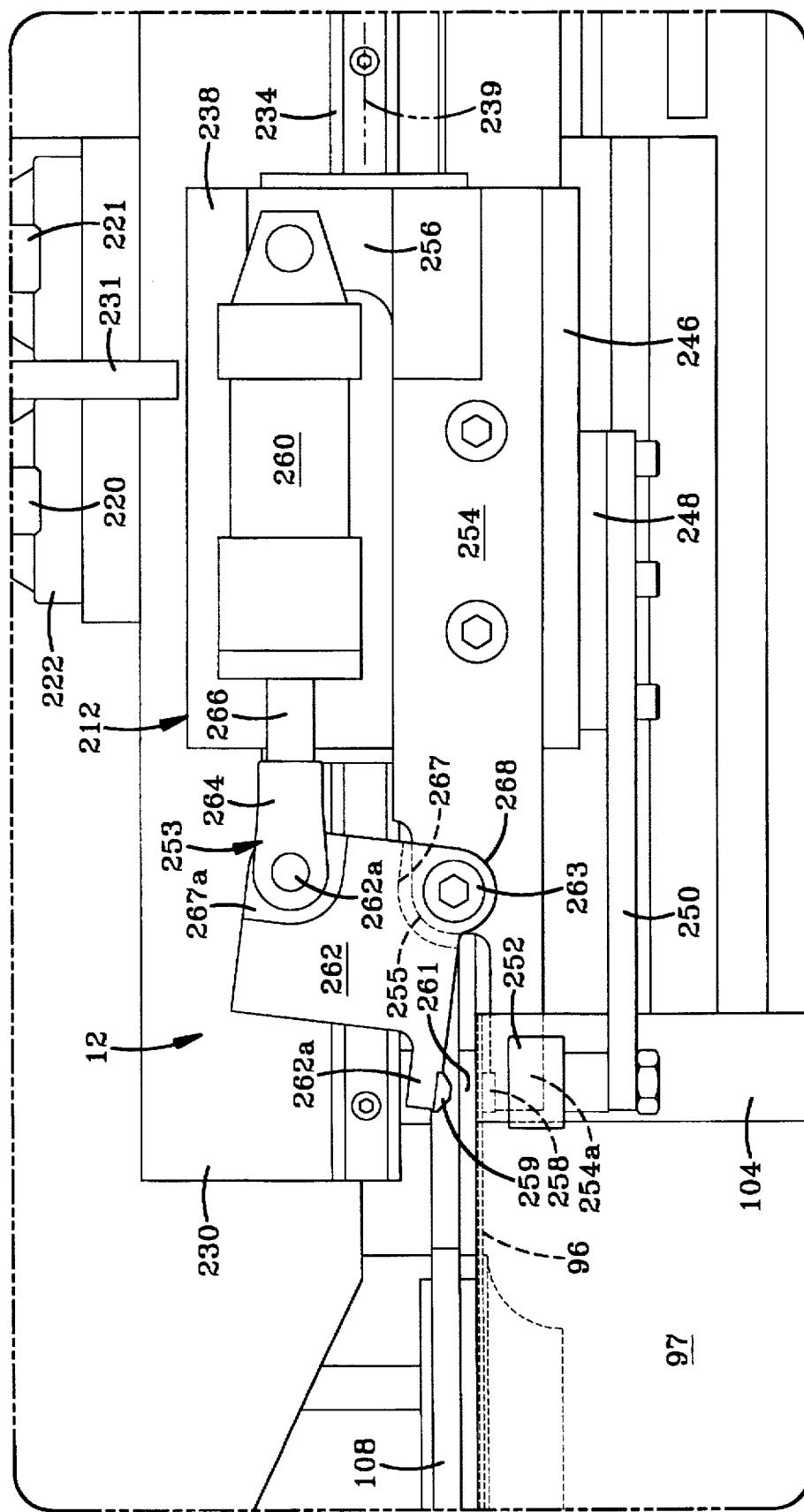
FIG. 18 is a greatly enlarged fragmentary top plan view of a portion of FIG. 2 showing the secondary welder subassembly in the fifth weld stage position of FIG. 17.

A guide rail 234 extends horizontally on shelf 230 and is engaged by a pair of slide blocks 236. A secondary welder shelf 238 is mounted on slide blocks 236 and a pneumatic pressure actuated cylinder 240 (FIGS. 7 and 7A) attaches to secondary welder shelf 238 for horizontally moving secondary welder subassemblies 12 in a pair of parallel linear paths 239 (FIG. 18). Cylinder 240 includes a piston rod 241 and a clevis 242 which connects piston rod 241 to an arm 243 which extends vertically to secondary welder shelf 238 (FIG. 3). A plate 246 is bolted to a top surface of secondary welder shelf 238 and slightly overhangs an inner edge of secondary welder shelf 238. A mounting bracket 248 extends vertically upwardly from an inner edge of plate 246 and a roller arm 250 extends horizontally therefrom toward the front of apparatus 1 and has a roller 252 attached to an outer front end thereof.

A pinch gun welder, indicated generally at 253 in FIG. 18, is bolted to a top surface of secondary welder shelf 238 and includes a pivot block 262, a bar 254 and a pneumatic pressure actuated weld cylinder 260. Pivot block 262 and bar 254 have front ends 262a and 254a, respectively, of a reduced transverse width A first welding tip 258 is attached to the outer surface of end 254a of bar 254 and a second welding tip 259 is attached to a inner surface of end 262a of pivot block 262. A gap 261 is formed between aligned and opposed welding tips 258 and 259 for receiving side flanges 104a of wrap panel 97 and short straight section 107a of end panel 96.

Figure 19:
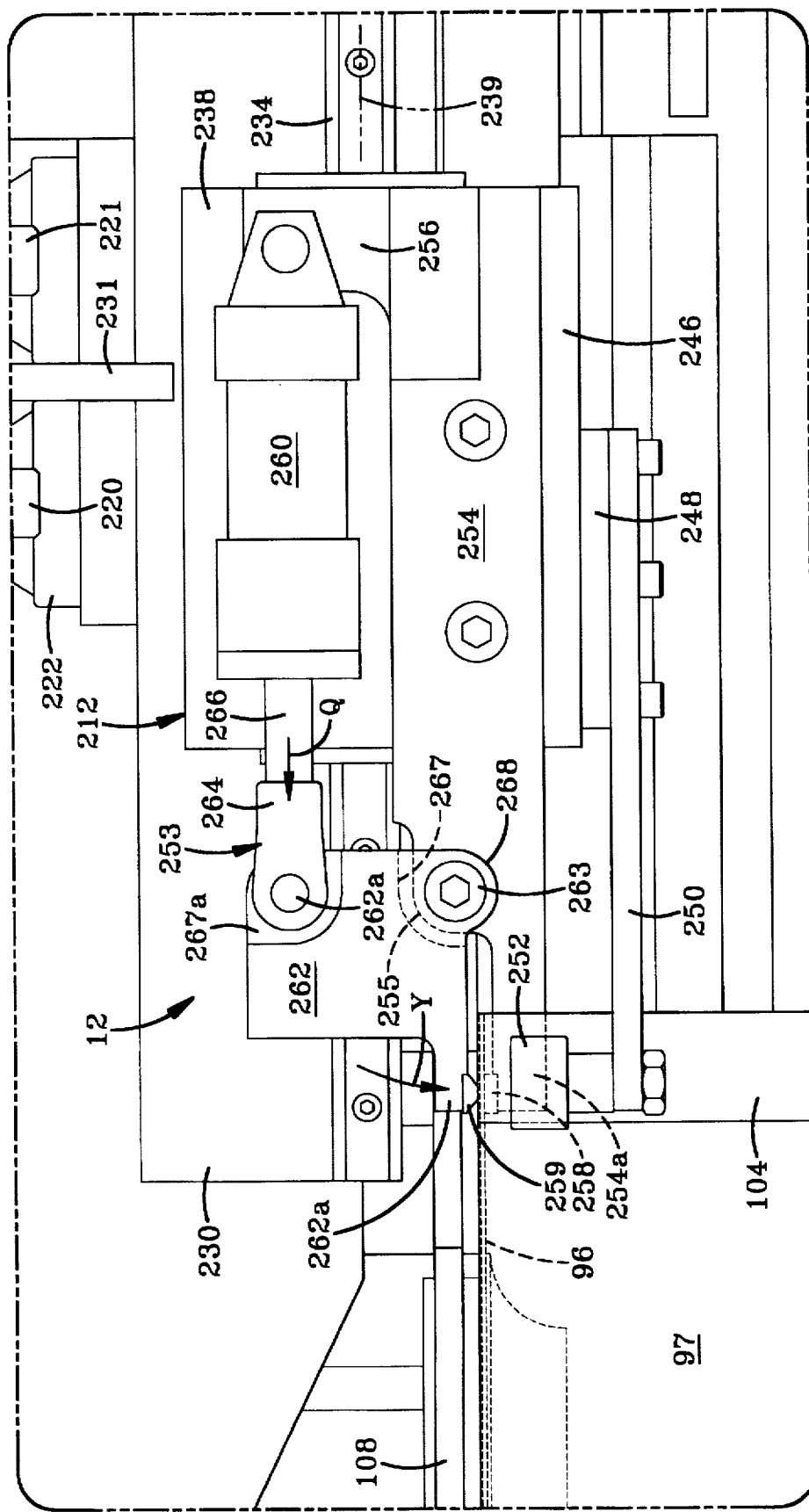
FIG. 19 is a view similar to FIG. 18 showing the secondary welder subassembly performing the fifth weld.

Pivot block 262 (FIGS. 18 and 19) includes a first cutout portion, indicated by dot-dash line 267, which forms an inwardly extending top lug 268 of a reduced thickness. The outer side of bar 254 includes a radially curved section indicated by dot-dash line 255. A pivot bolt 263 pivotally fastens pivot block 262 to bar 254 wherein radially curved section 255 sits within first cutout portion 267 and lug 268 sits on the top of bar 254. A cylinder support 256 is fastened to a rear end of bar 254 and extends outwardly therefrom. Weld cylinder 260 is mounted to support 256 and includes a forwardly extending piston rod 266. A clevis 264 is attached to a front end of pivot rod 266 and is mounted to a second cutout portion 267a of pivot block 262 by a pivot pin 262a.

Panel advancing subassembly 18 extends horizontally along left side 4 and is mounted to front and rear rests 271 and 271a, respectively, which, in turn, are mounted on base 14 (FIGS. 7 and 7A). Panel advancing subassembly 18 includes an upright advancing ram 269, a T-shaped seat 274 (FIG. 3) and a push cylinder 270. Advancing ram 269 is rectangular-shaped and is welded to a plate 273 which is bolted to T-shaped seat 274 which slidably mounts to cylinder 270. A push plate 276 is attached to a side surface of ram 269 and is formed with a notch 272. Cylinder 270 has a thin flexible metal strip 275 (FIG. 2) extending along its top center which raises in a particular location and is shifted along cylinder 270 to contact and drive seat 274.

It is understood that apparatus 1 can be configured to assemble blower housings 94 of various sizes by replacing end panel plates 108 on mounting plates 110 with plates of various sizes to match the particular end panel of the blower housing desired. It is also understood that apparatus 1 is preferably controlled by a programmable logic controller (PLC) which includes a control panel (not shown) to display the assembly options and the status of the assembly, and to allow the operator to automatically or manually run the sequence of operations when forming the blower housing 94.

Apparatus 1 may also include various safety devices such as metal screens to prevent arcs from the welders from flying onto and burning the operator, a "kill switch" mounted on a front screen door which prevents apparatus 1 from assembling the blower housing while the door is open or dual palm buttons which require the operator to begin and continue the assembly process with both hands depressing a button thus preventing the operator from getting a finger or hand caught in the machinery.

When setting up apparatus 1 to produce a particular size of blower housing 94 the holddown cylinders 88 are fully extended by the control unit to raise motor subassemblies 6 and end panel plates 108 to a position as shown in FIG. 7A. If end panel plates 108 which are attached to mounting plates 110 are of a different size than end panels 96, the end panel plates are unbolted from mounted plates 110 and replaced with end panel plates of the correct size. Quick connects (not shown) allow easy attachment and removal of the hydraulic pressure supply lines to cylinders 122.

Course adjustment wheel 30 adjusts side 2 in the horizontal direction as indicated by arrow A of FIG. 5A. As wheel 30 is turned, gear box 32 rotates adjustment rod 38 which, in turn, drives gear boxes 40 and 41. Gear boxes 40 and 41 rotate leadscrews 58 and 59, respectively, and follower nuts 64 slide right side 2 along guide rails 54 and 55. Course adjustment wheel 30 is turned until the distance between right side 2 and left side 4 is approximately equal to the width of wrap panel 97. Fine tuning adjustment wheel 44 is then turned (arrow B, FIG. 5A) until the indicator of right side 2 reaches a desired set-point on the scale of base 14. Secondary adjustment wheels 224 turn leadscrews 225 which vertically adjust follower nuts 227 (arrows C, FIG. 7A). Follower nuts 227 adjust secondary welder shelves 238 and pinch gun welders 253 until indicators 232 reach a desired set-point on scales 233. Finally, various options on the control unit are selected to instruct apparatus 1 as to the size of the particular blower housing.

The sequence of operation begins with all of the subassemblies of apparatus 1 in a home position shown in FIG. 7A. Primary welder arms 206 are retracted into welding gun 204 (FIG. 12). Weld cylinders 260 are retracted widening gaps 261 of welding tips 258 and 259 (FIG. 18). Main cylinders 167 are fully extended to position lower carriage assemblies 154 in a forward position. Holddown cylinders 88 are fully extended and end panel plates 108 are rotated wherein first portions 111 extend forwardly and slightly downwardly. Piston rods 124 of clamping mechanisms 120 are fully extended and pawls 126 are positioned generally parallel to ledges 116 of clamping surfaces 114. Column assemblies 5 rest on rubber cushions 92, which controls the home position for the column assembly. Rubber cushions 92 are replaceable depending on the size of the blower housing to be manufactured by apparatus 1.

Figure 13:
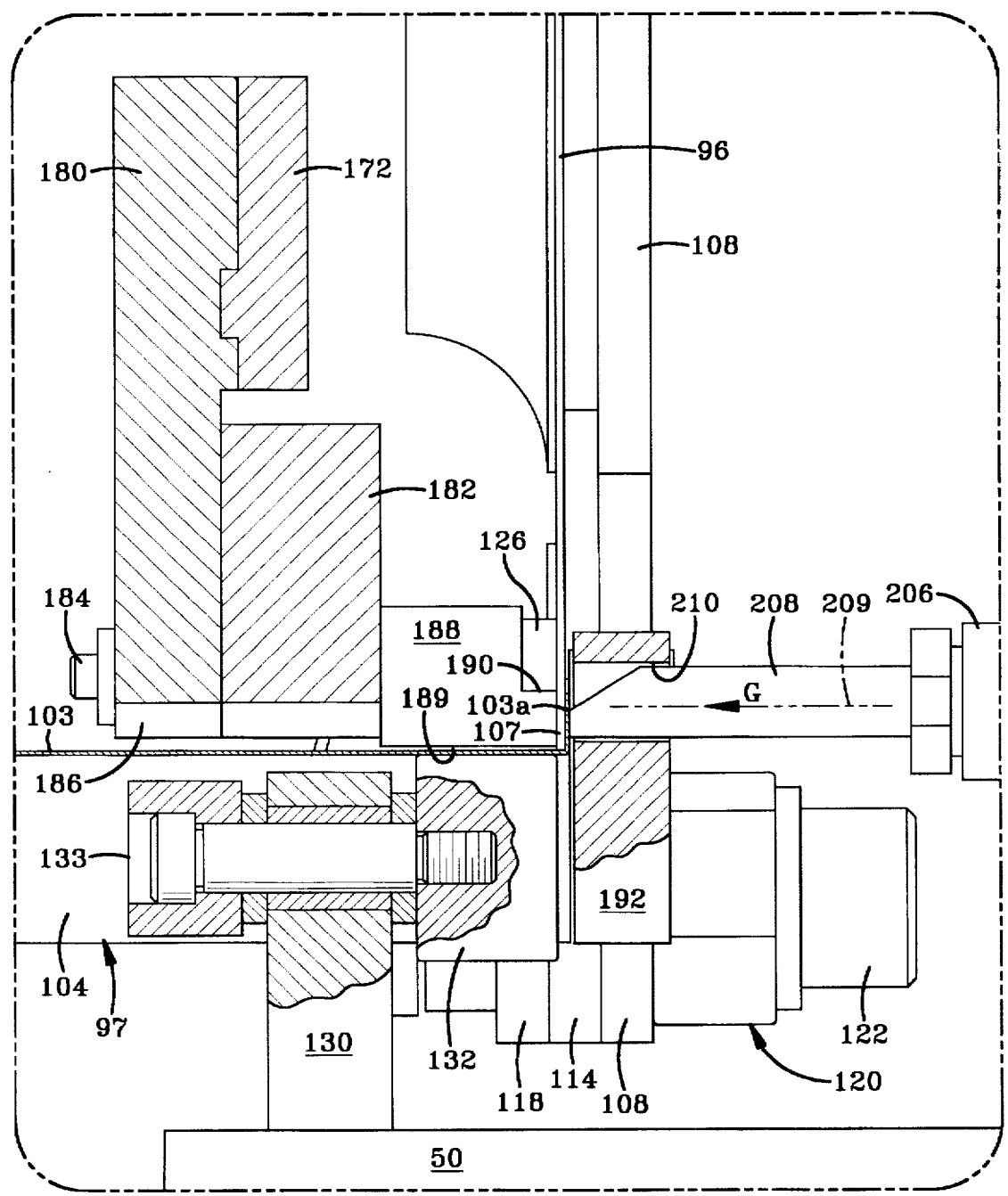
FIG. 13 is a greatly enlarged fragmentary sectional view similar to FIG. 12 showing the primary welder subassembly welding the end panel to the wrap panel.

The operator slides wrap panel 97 on rollers 132 and into gaps 189 (FIGS. 8, 12 and 13). Wrap panel 97 is pushed rearwardly until lip 104 contacts the front of rollers 132 (FIG. 8). Side flanges 103a of flat section 103 of wrap panel 97 extend upwardly and slide within gaps 194 (FIG. 12). Wrap panel 97 extends rearwardly and is supported horizontally on mounting blocks 196 and support boards 199 (FIG. 11).

The operator returns to the control unit and issues the next set of instructions to apparatus 1. Motors 68 rotate drive shafts 75 in unison which, in turn, rotate spindles 110a, mounting plate 110 and end panel plates 108 in the direction of arrow D, FIG. 7A. Holddown cylinders 88 retract piston rods 90 causing slide blocks 85 to slide column assembly 5 vertically downwardly on guide rails 84. Rubber sleeves 92 cushion the downward force of column assembly 5.

Figure 9:
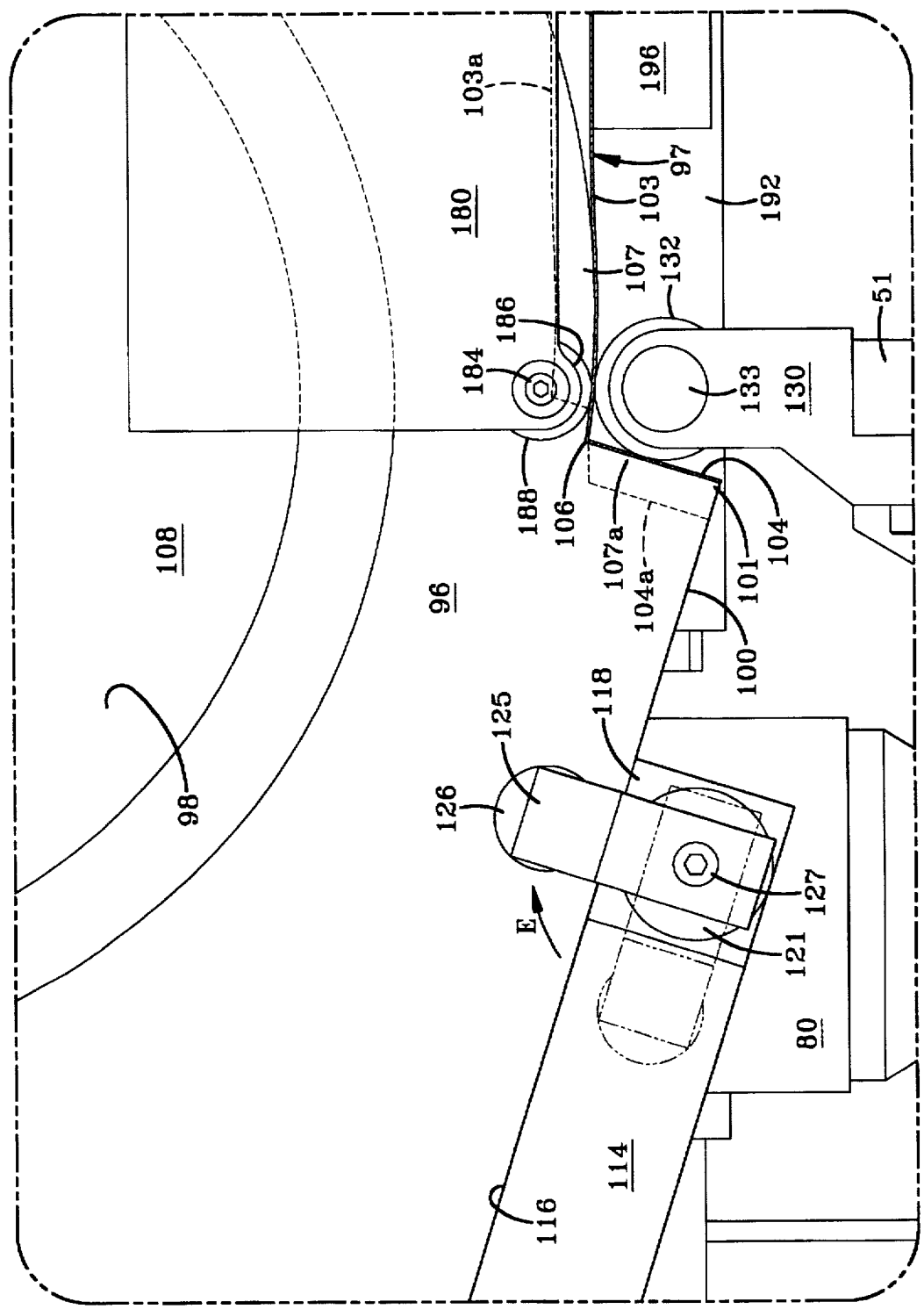
FIG. 9 is a greatly enlarged fragmentary view of a portion of FIG. 7 showing the wrap panel and end panels being held by the apparatus of the present invention.

Next, the operator positions end panels 96 on end panel plates 108, wherein lips 107 of the end panels sit adjacent to lip 104 of the wrap panel and side flanges 104a extend along the outer surface of the end panels (FIG. 9). Straight edges 100 of end panels 96 rest on ledges 116 of clamping surfaces 114. The operator presses a foot switch (not shown) to activate clamping mechanisms 120 while holding the end panels in position. Pawls 126 rotate 90° in the direction of arrow E, FIG. 9, and cylinders 122 retract piston rods 124 (arrow F, FIG. 10) to clamp surfaces 128 against end panels 96. The operator closes the safety screen door and returns to the control unit to initiate the auto sequence or sequence of operation by depressing the dual palm buttons.

The assembly process begins with welding guns 204 extending welding tips 208 through holes 210 of side bars 192 in linear path 209 and in a common plane toward each other (arrow G, FIG. 13) until welding tips 208 are adjacent side flanges 104a of the wrap panel. First welds 280 (FIG. 27) are formed along outer edges 99 of end panels 96 adjacent notches 106, and welding tips 208 move away from each other in linear path 209.

Main cylinders 167 index lower carriage assemblies 154 rearwardly a predetermined distance in a pair of parallel linear paths 297 (FIG. 24) generally perpendicular to linear path 209 while end panels 96 and wrap panel 97 remain stationary. Main cylinders 167 retract piston rods 173 in unison and clevises 175 pull arms 177 rearwardly. Slide blocks 164 slide on guide rails 160 and 162 causing lower carriage assembly 154 to slide rearwardly in their respective linear paths 297 and in the direction of arrow S, FIGS. 22–25. Welding guns 204 extend welding tips 208 through holes 210 of side bars 192 in another linear path and primary welder subassemblies 10 perform second welds 281 (FIG. 27) adjacent to first welds 280. Main cylinders 167 extend position rods 173 forward to move lower carriage assemblies 154 in linear paths 297 back to in their original position of FIG. 7.

Figure 14:
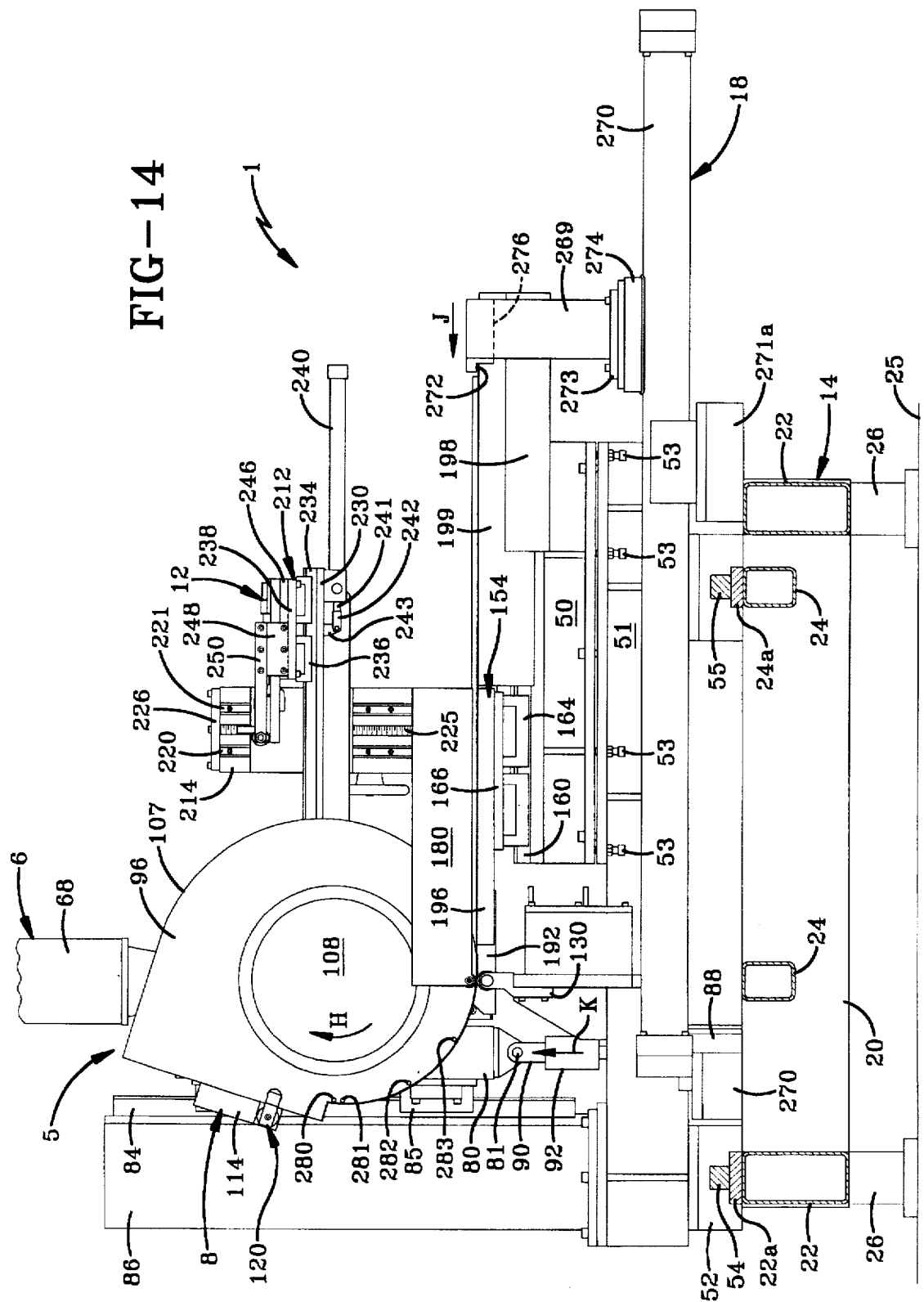
FIG. 14 is a side sectional view similar to FIG. 7 showing a second weld stage position.

Motors 68 rotate drive shafts 71 in unison which, in turn, rotate sprockets 72, chains 74 and sprockets 76. Sprockets 76 rotate drive shafts 75 which, in turn, rotate spindles 110a, mounting plates 110, end panel plates 108 and end panels 96 in the direction of arrow H, FIG. 14. Wrap panel 97 is pulled forward by it connection to end panels 96 by welds 280 and 281 and wraps around edge 99 of end panels 96. Panel advancing subassembly 18 pushes wrap panel 97 forward (arrow J, FIG. 14) to assist the rotational wrapping movement of wrap panel 97. As wrap panel 97 slides through gap 189 between head 188 and roller 132 it is retained therein the rollers 132 and the heads (FIG. 9).

Counter-balance air cylinders 88 assist in balancing the weight of end panel plates 96 on work-holding subassembly 8. Piston rods 90 of cylinders 88 extend upwardly in the direction of arrow K (FIG. 14) to maintain a balanced aligned relationship between the spiral edge 99 of blower housing 94 and primary welder subassembly 10.

Motors 68 then index end panels 96 through an arc of approximately 30° while the primary welders remain Stationary. When end panels 96 have finished rotating, the primary welders move in linear path 209 to form third welds 282. Motors 68 continue to index the end panels in 300 increments wrapping wrap panel 97 around the end panels and the primary welders continue to move reciprocally in linear path 209 to form fourth, fifth and sixth welds 283, 284 and 285, respectively. Panel advancing subassemblies 18 continue to push panel 97 and air cylinders 88 continue to move upwardly as required to align spiral edges 99 and welding tips 208 of primary welder subassemblies 10.

Figure 15:
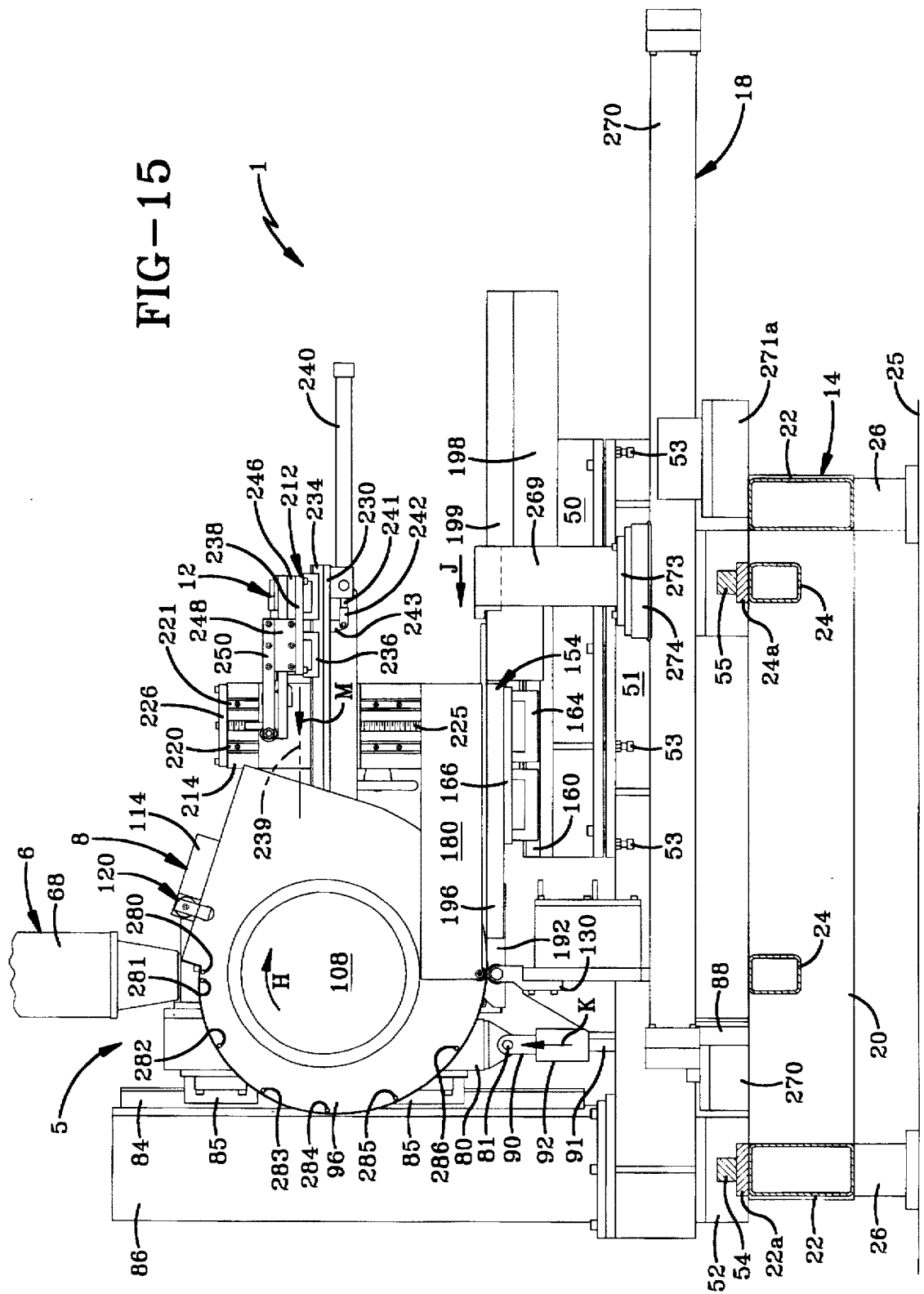
FIG. 15 is a view similar to FIG. 14 showing a third weld stage position.
Figure 16:
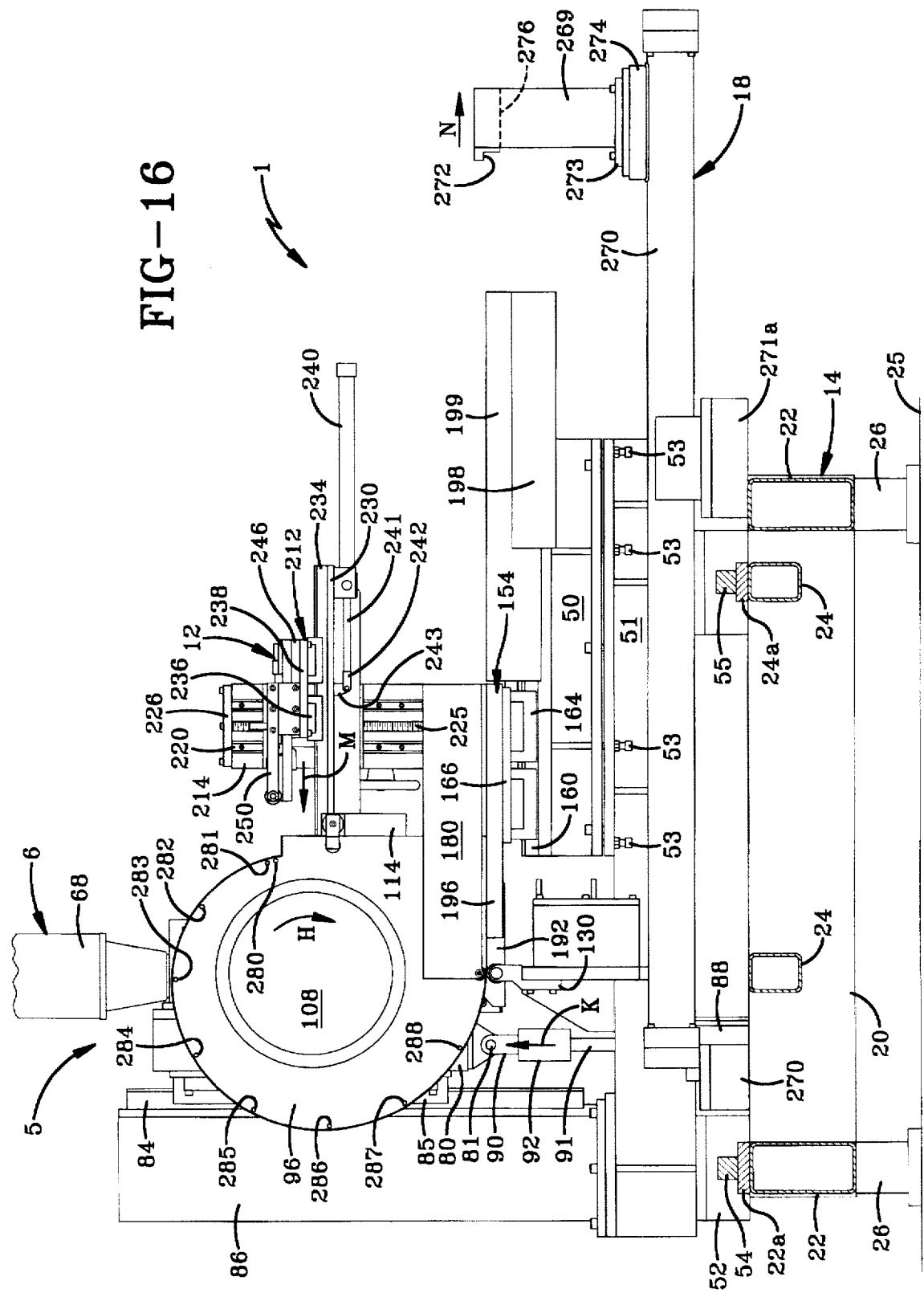
FIG. 16 is a view similar to FIG. 15 showing a fourth weld stage position.

After motors 68 index the end panels 30° to the position of seventh welds 286, cylinders 240 extend in the direction of arrow M, FIG. 15 to move upper carriages 212 in linear paths 239 from the position of FIG. 15 to the position shown in FIG. 16, which is about half the distance to the rear end of blower housing 94. Piston rods 241 push arms 243 of secondary welder shelves 238 causing slide blocks 236 to slide forward on guide rails 234. Primary welder subassembly 10 moves in linear path 209 and performs weld 286 as upper carriages 212 are indexed forward in linear path 239. Panel advancing subassembly 18 retracts ram 269 (arrow N, FIG. 16) to its original position once wrap panel 97 is sufficiently secured to end panels 96 by the welds.

After upper carriages 212 are moved to the position of FIG. 16, motors 68 rotate the end panels 30° and the stationary welders move in linear path 209 to perform welds 287. End panels 96 are indexed through three additional 30° increments by motors 68 and primary welders move reciprocally in linear path 209 to perform eighth, ninth and tenth welds 287, 288 and 289, (FIG. 27) respectively.

Figure 17:
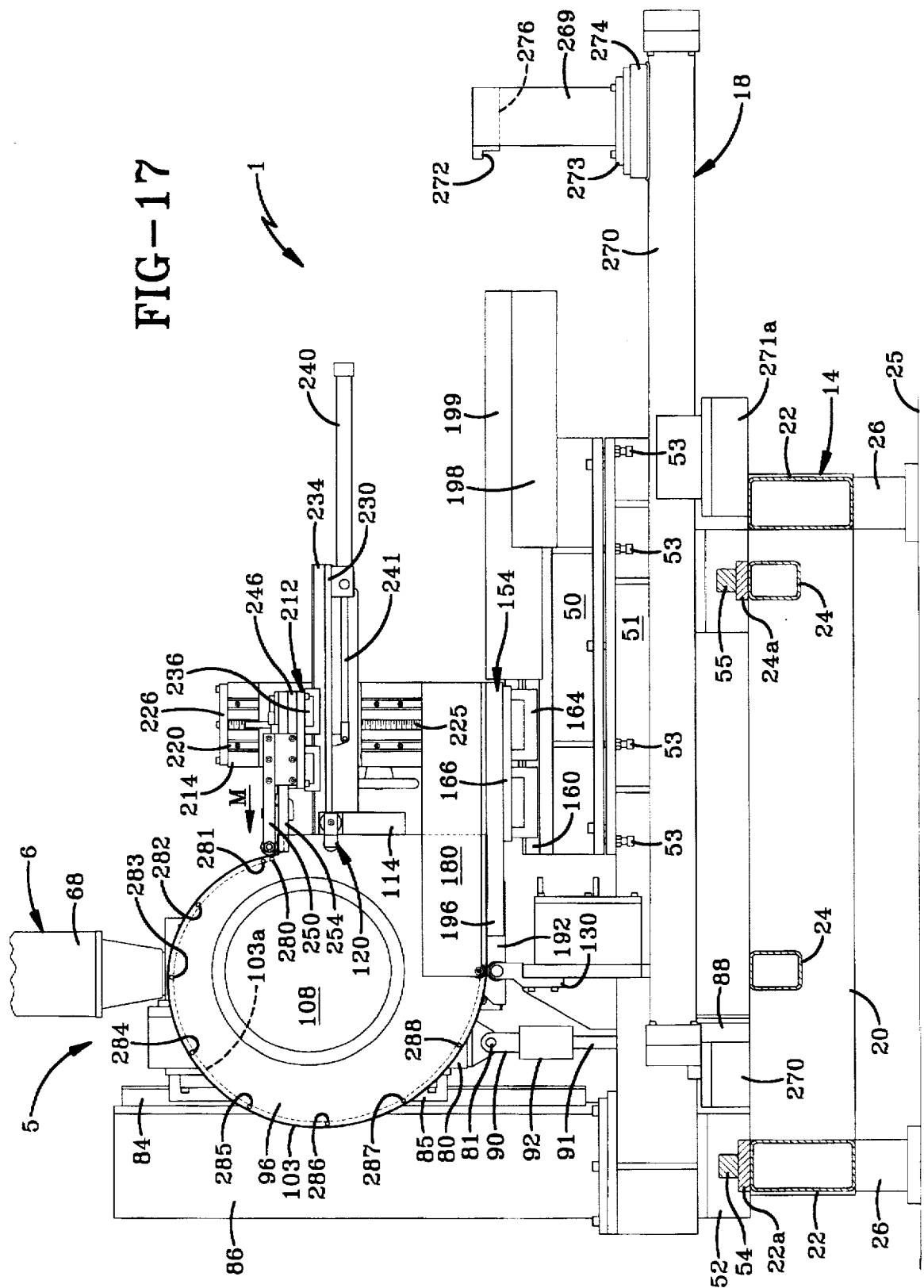
FIG. 17 is a view similar to FIG. 16 showing a fifth weld stage position.
Figure 20:
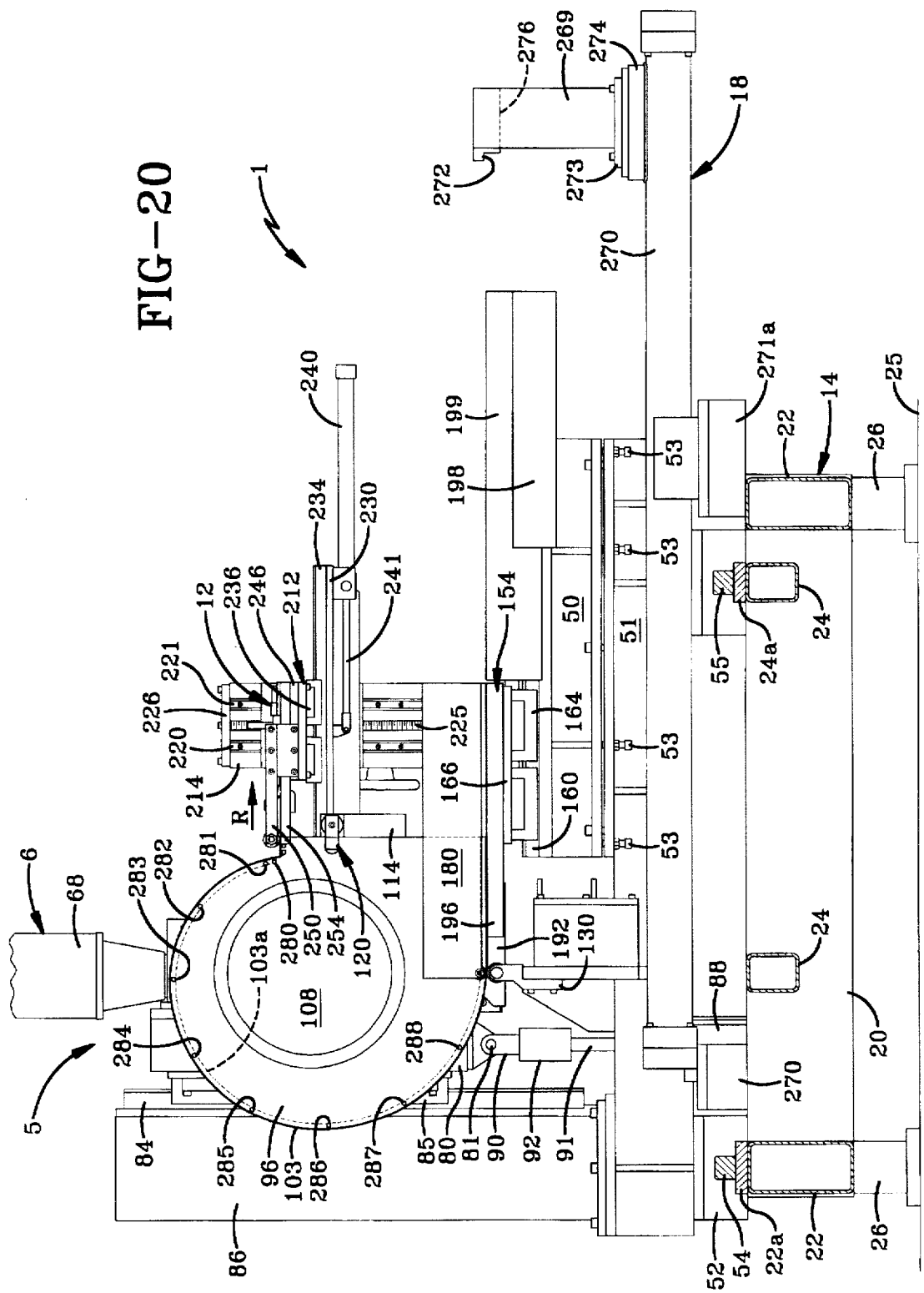
FIG. 20 is a view similar to FIG. 17 showing a seventh weld stage position.

End panel plates 108 remain stationary after primary welder subassemblies perform the tenth welds 289. Then cylinders 240 index upper carriages 212 forward (arrow M, FIG. 17), in linear paths 239 and in a common plane generally perpendicular to the first common plane containing linear path 209, until side flanges 104a of wrap panel 97 and lips 107 end panels 96 are received in gap 261 (FIG. 18), and lip 104 is sandwiched by rollers 252 and the front of bars 254. Weld cylinders 260 extend piston rods 266 (arrow Q, FIG. 19) and rotate pivot blocks 262 around pivot pins 262a (arrow Y, FIG. 19). Weld cylinders 260 extend until welding tips 258 and 259 pinch side flanges 104a and lips 107 therebetween and perform first secondary welds 290. Weld cylinders 260 then retract to widen gap 261 opening pinch gun welder 253. Cylinders 240 retract to index upper carriage 212 (arrow R, FIG. 20) a fraction of an inch in linear path 239 and cylinders 260 move pinch gun welders 253 back into welding position to perform welds the second secondary welds 291. Cylinders 240 again retract upper carriage assemblies 212 in linear paths 239 and pinch gun welders 253 to a third secondary weld position whereat pinch gun welders 253 perform third secondary welds 292 (FIG. 20).

Figure 21:
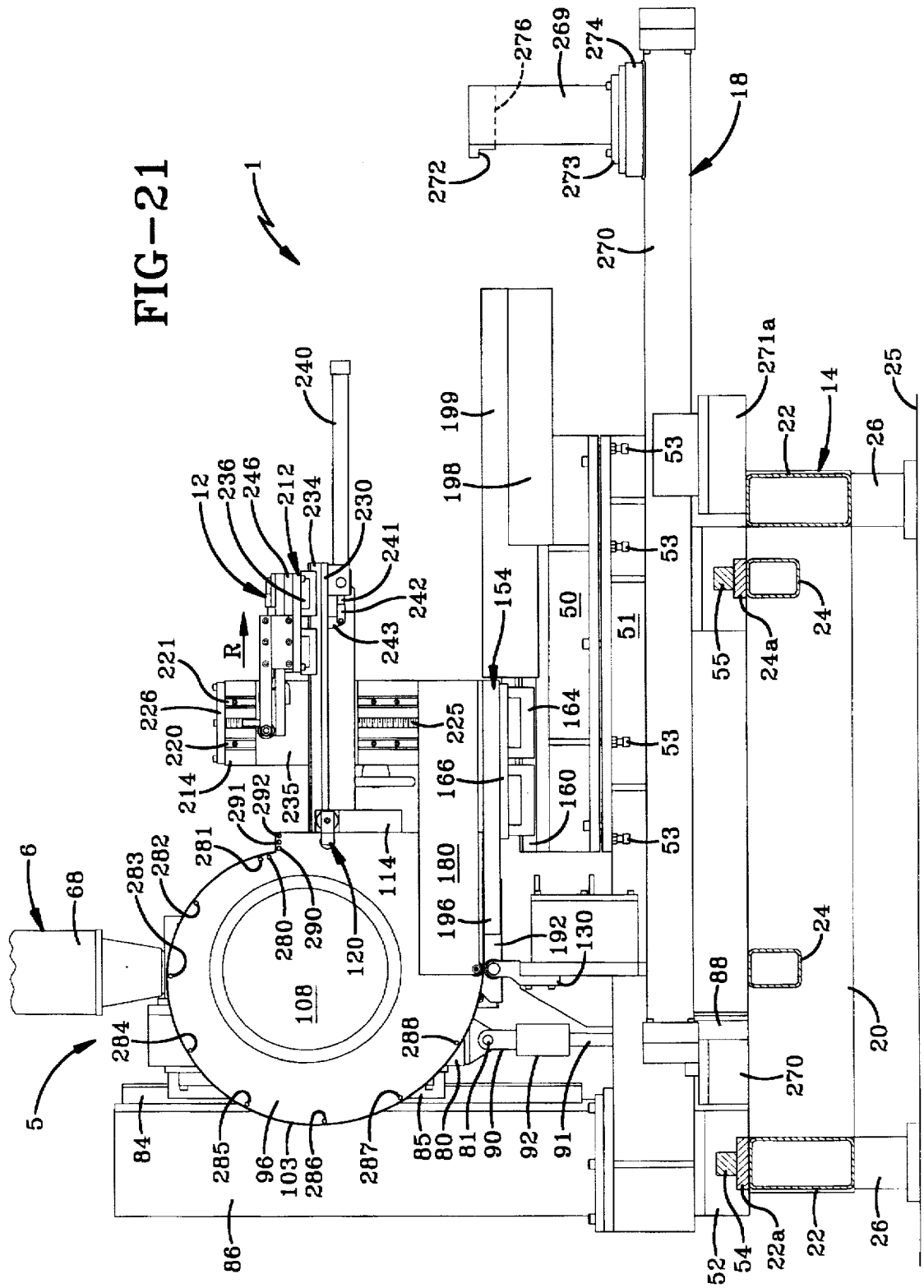
FIG. 21 is a view similar to FIG. 20 showing an eighth weld stage position.
Figure 22:
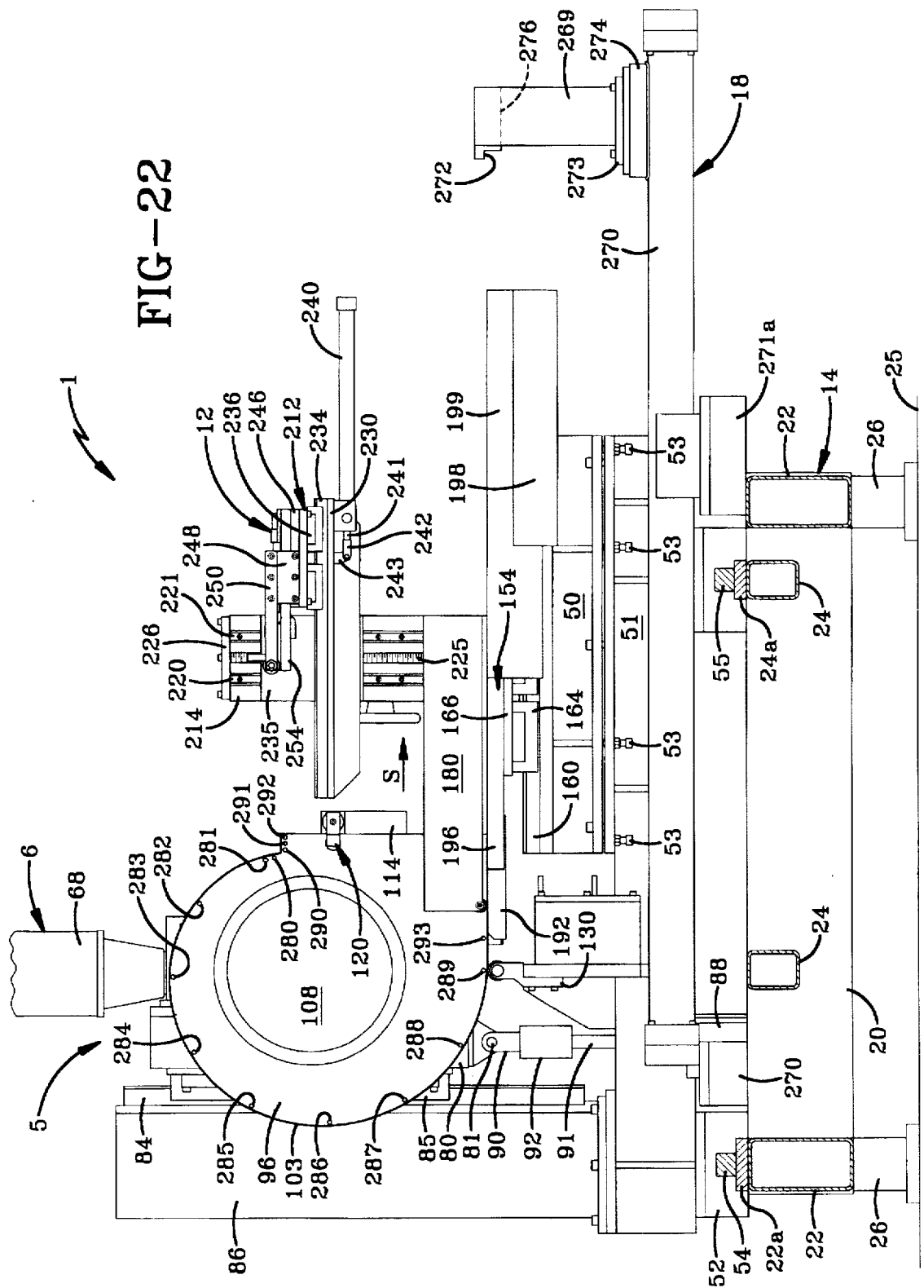
FIG. 22 is a view similar to FIG. 21 showing a ninth weld stage position.
Figure 23:
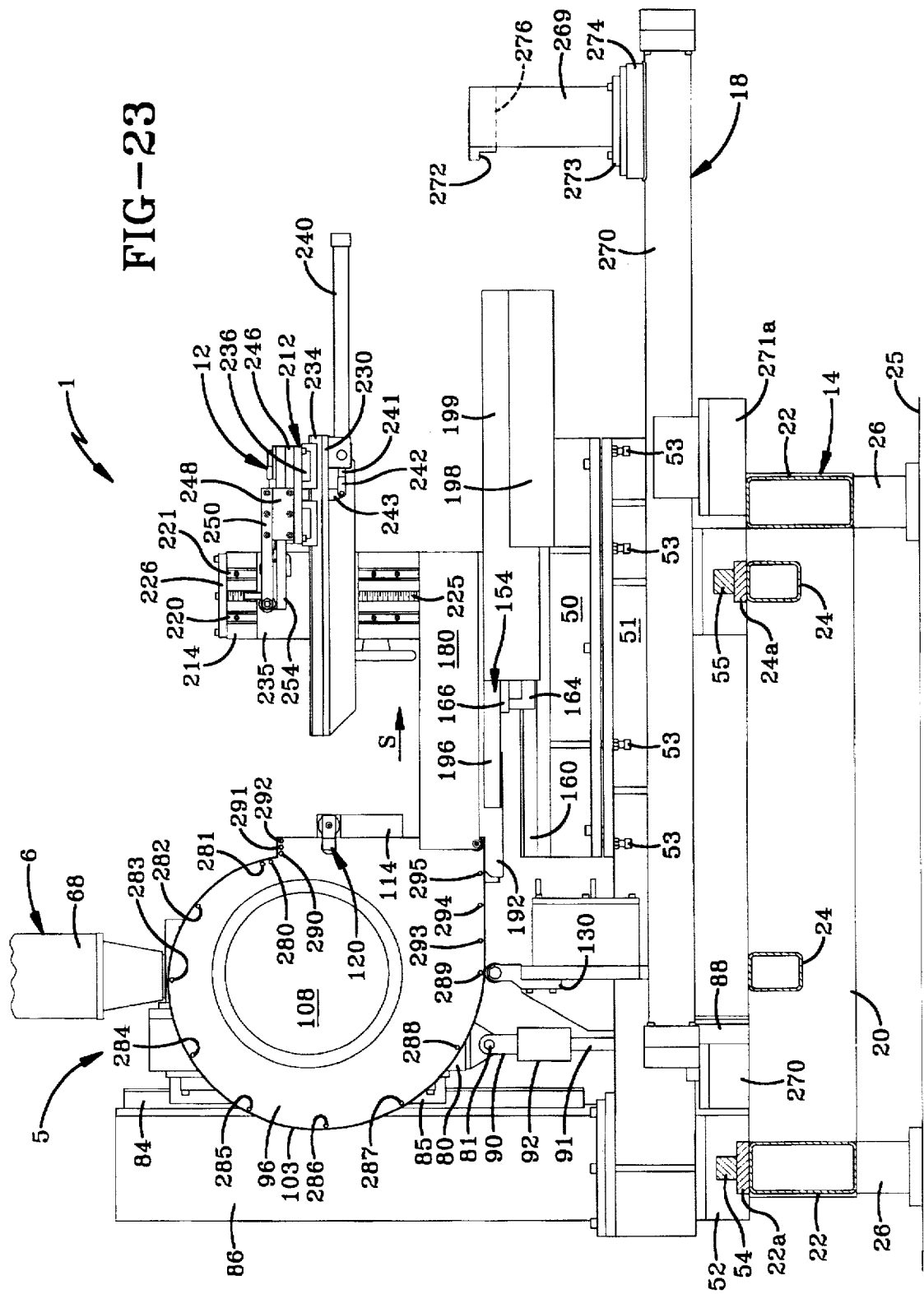
FIG. 23 is a view similar to FIG. 22 showing a tenth weld stage position.
Figure 24:
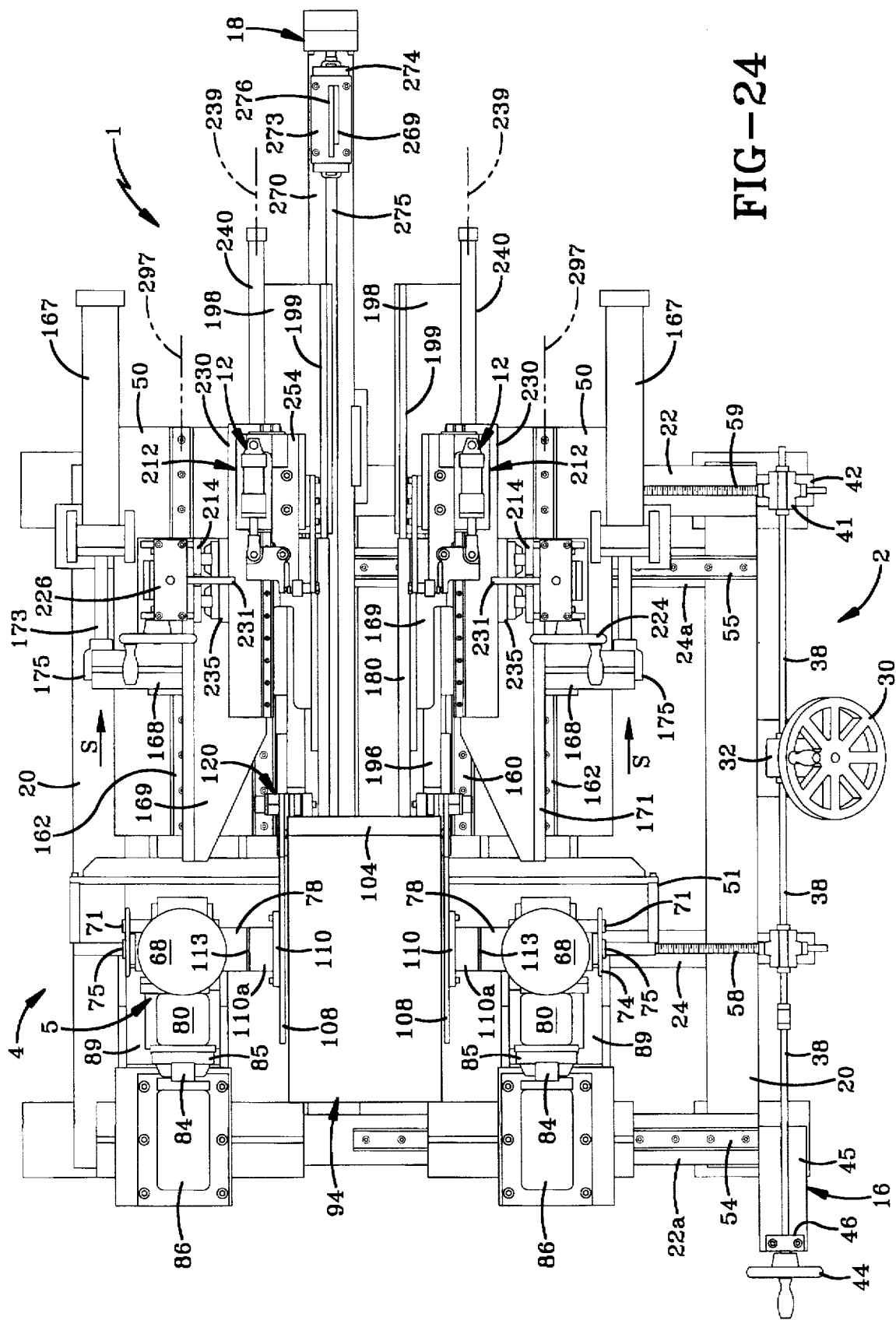
FIG. 24 is a top plan view of the tenth weld stage position of FIG. 23.

After completion of third secondary welds 292 and side flanges 104a of lip 104 have been secured to straight section 107a of end panel 96, cylinders 240 fully retract (arrow R, FIG. 21) to move upper carriage assemblies 212 rearwardly in linear paths 239. Main cylinders 167 then are actuated to retract lower carriage assemblies 154 rearwardly from the position of FIG. 21 to that of FIG. 22 to complete the welding sequence.

Welding guns 204 extend welding tips 208 through holes 210 of side bars 192 and welding tips 208 move in linear path 209 to perform eleventh welds 293 (FIG. 27) which join straight sections 107b of end panel 96 with side flanges 103a of wrap panel 97. End panels plates 108, end panels 96 and wrap panel 97 remain stationary as main cylinders 167 move primary welder subassemblies 10 rearwardly along straight sections 107b of the end panels in linear paths 297 and in the direction of arrow S (FIGS. 22–25). Primary welder subassemblies 10 perform twelfth welds 294. Lower carriages 154 are indexed rearwardly in linear paths 297 through a series of steps along straight section 107b while end panels 96 and wrap panel 97 remain stationary, and primary welder subassemblies 10 perform thirteenth and fourteenth welds 295 and 296, respectively by moving in a plurality of parallel linear paths which align with the weld positions.

Figure 25:
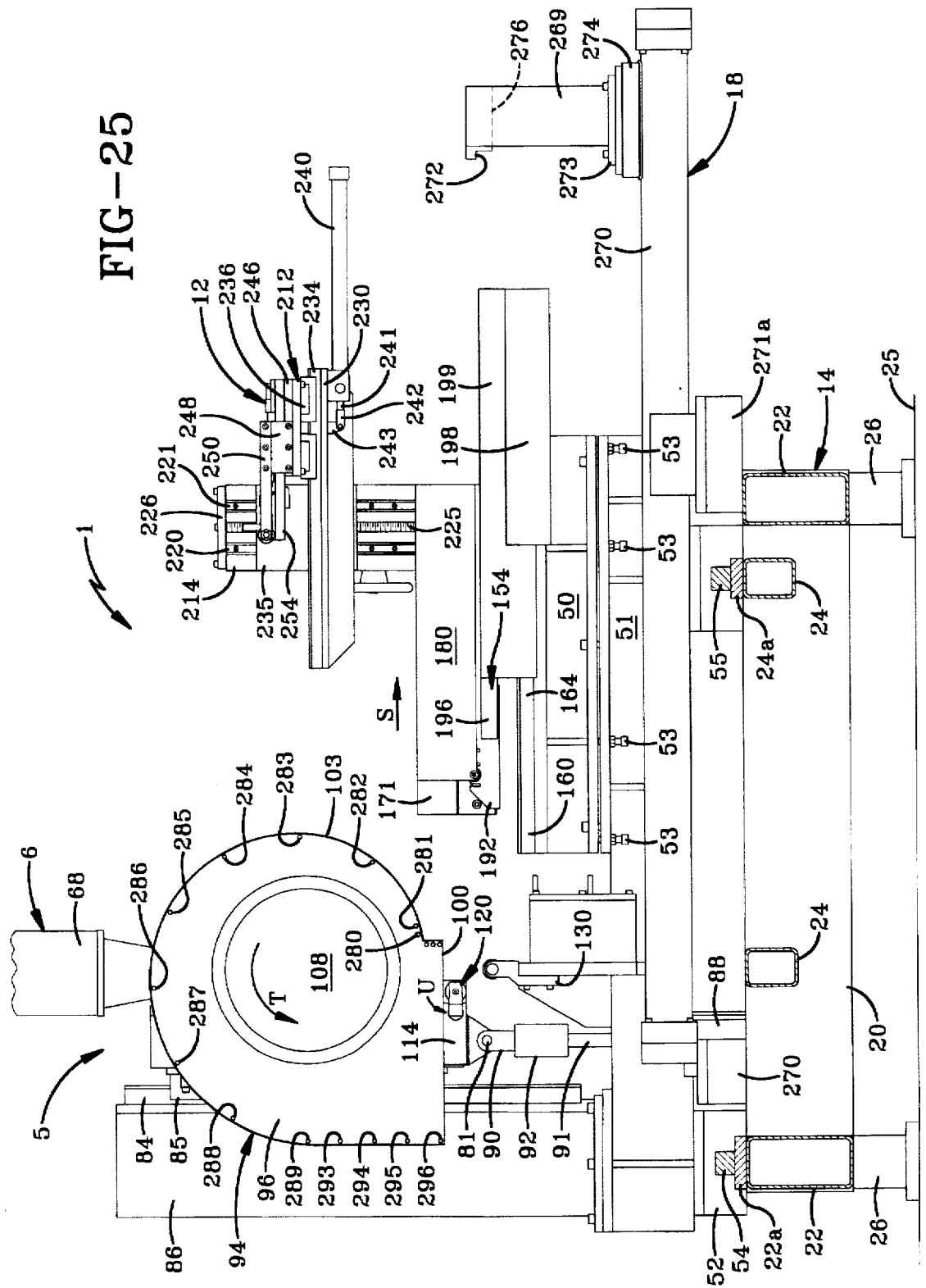
FIG. 25 is a view similar to FIG. 23 showing a lower carriage assembly in a fully retracted position and showing the clamping mechanism un-clamped.
Figure 26:
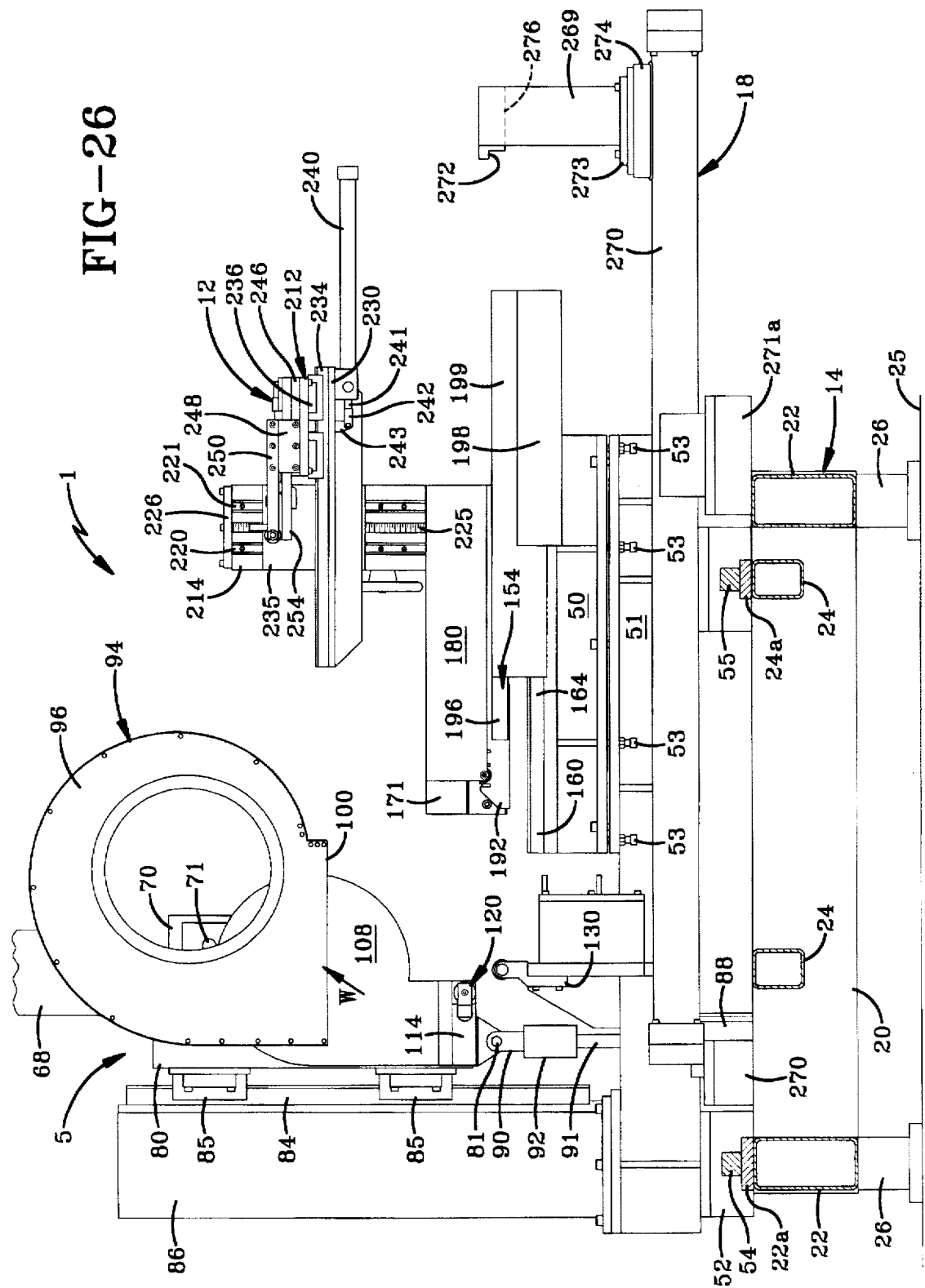
FIG. 26 is a view similar to FIG. 25 showing the assembled blower housing being unloaded from the apparatus.

After primary welder subassemblies 10 perform the last weld 296 (FIGS. 23 and 24), main cylinders 167 move lower carriages 154 rearwardly in linear paths 297 a sufficient distance wherein first and second support plates 180 and 182, respectively, head 188, side bar 192 and mounting block 196 are clear of blower housing 94 (FIG. 25). Cylinders 88 fully extend to raise column assembly 5 and motors 68 rotate the end panel plates 108 and the completed blower housing 94 90° in the direction of arrow T (FIG. 25). Cylinders 122 extend piston rods 124 and rotate clamping arms 125 90° as shown by arrow U (FIG. 25). Blower housing 94 is lifted from apparatus 1 (arrow W, FIG. 26) either manually or automatically using an unload subassembly (not shown). All subassemblies are returned to the home position as described above for further manufacturing of blower housings 94.

One particular type of automatic unload subassembly which may be utilized with apparatus 1 uses a plurality of vacuum cups mounted on an overhead structure. The structure is lowered and the vacuum cups are brought into position with the wrap panel. The suction from the vacuum cups allows the unload subassembly to pick up the blower housing and the structure moves to a rear of apparatus 1 to release the blower housing onto a conveyor, pallet or other type of discharge mechanism. Other types of unload subassemblies may be utilized with apparatus 1 without affecting the concept of the invention.

In summary, improved apparatus 1 and the method of the present invention, enables blower housing 94 to be assembled from end panels 96 and wrap panel 97. Motor subassemblies 6 rotate the panels through a series of welding stages or positions wherein cylinders 167 and 240 slide lower carriage 154 and upper carriage 212, respectively, into position for subsequent assembly of wrap panel 97 and end panels 96 by primary welder subassemblies 10 and secondary welder subassemblies 12. Work-holding subassembly 8 uses clamping mechanism 120 to hold end panels 96 to end panel plates 108 and rollers 132 permit wrap panel 97 to roll thereon. Width adjustment subassembly 16 allows right side 2 to move toward and away from left side 4 to accommodate blower housings of various sizes. Further panel advancing subassembly 18 pushes wrap panel 97 forward while the wrap panel is being wrapped around end panels 96.

In accordance with the main feature of the invention, primary welder subassemblies 10 move in linear paths for performing welds 282 through 289 while motor subassemblies 6 and work-holding subassemblies 8 index end panels 96 through a series of 30° rotations. After completion of the tenth welds 289, cylinders 240 move upper carriages 212 and pinch gun welders 253 horizontally forwardly along guide rails 234 in linear path 239 to perform first, second and third secondary welds 290, 291 and 292, respectively. Secondary welder subassemblies 12 perform the secondary welds while the end panels and wrap panel remain stationary. Finally, lower carriages 154 and the primary welder subassemblies 10 move horizontally rearwardly along guide rails 160 and 162 in linear path 297 while the blower housing remains stationary. The primary welder assemblies are indexed along straight edge 107b of the end panels to perform welds 293 through 296. Cylinders 167 move lower carriages 154 rearwardly in linear path 297 wherein lower carriages 154 are clear of blower housing 94 and the completed blower housing is removed from the apparatus.

The primary welder subassemblies, secondary welder subassemblies and lower carriages move in their respective linear paths. The term "linear path" being defined as a particular straight line of movement. The linear paths of the secondary welder subassemblies and the lower carriages extend in a common direction generally perpendicular to the direction of the linear paths of the primary welder subassemblies. The linear movement of the primary and secondary welder subassemblies along the respective guide rails allows apparatus 1 to manufacture a blower housing with a curved weld configuration without rotational movement of the primary and secondary welders subassemblies which is expensive and susceptible to frequent malfunctions.

Accordingly, the improved method and apparatus for forming blower housing assemblies are simplified, provides an effective, safe, inexpensive, and efficient method and apparatus which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved method and apparatus are constructed and used, the characteristics of the construction, and the advantageous, new and useful results obtained; the new and useful structures, devices, elements, arrangements, parts and combinations, are set forth in the appended claims.

I claim:

1. Apparatus for forming a metal housing having a pair of spaced end panels and an intervening wrap panel connected between the end panels by a plurality of welds, said apparatus including:

a base;

a pair of work-holding subassemblies rotatably mounted on the base for holding the end panels in a position for assembly to the wrap panel to form the housing;

rotating means for rotating the work-holding subassemblies between a plurality of weld positions;

welding means for welding the end panels to the wrap panel;

guide means for moving the welding means only in a linear path when said welding means welds the end panels to the wrap panel.

2. The apparatus defined in claim 1 which further includes a stationary side spaced from and similar to an adjustable side, said adjustable side being movable horizontally toward and away from said stationary side by a width adjustment subassembly.

3. The apparatus defined in claim 2 in which the rotating means includes a motor and a drive shaft mounted on each of the stationary and adjustable sides; and in which each of the drive shafts is connected between one of said motors and one of the work-holding subassemblies.

4. The apparatus defined in claim 2 in which the welding mean includes a primary welder subassembly mounted on each of the stationary and adjustable sides, each of said primary welder subassemblies includes a welding gun.

5. The apparatus defined in claim 2 in which one work-holding subassembly is mounted on each of the stationary and adjustable sides; and in which each of said work-holding subassemblies includes an end panel plate and a clamping mechanism attached to said end panel plate for holding the end panels thereon.

6. The apparatus defined in claim 1 which further includes a panel advancing subassembly mounted on the base having a ram and a push cylinder for moving the wrap panel toward the work-holding subassemblies.

7. The apparatus defined in claim 2 in which the welding means includes a secondary welder subassembly mounted on each of the stationary and adjustable sides; and in which each of the secondary welder subassemblies includes a pinch gun welder.

8. The apparatus defined in claim 7 in which each of the stationary and adjustable sides includes a support block, a lower carriage subassembly mounted on the support block and an upper carriage subassembly slidably mounted on the lower carriage subassembly; and in which each of the secondary welder subassemblies is mounted on one of said upper carriage subassemblies.

9. The apparatus defined in claim 8 in which adjustment means is mounted on each of the lower carriage subassemblies for vertically adjusting the upper carriage subassemblies and secondary welder subassemblies.

10. A method for forming a metal housing having a pair of spaced end panels and an intervening wrap panel connected between the end panels by a plurality of welds, said method including the steps of placing the wrap panel on a work holder subassembly;

clamping a pair of the end panels adjacent the wrap panel in a predetermined spaced relationship on the work holder subassembly;

moving a pair of primary welder subassemblies in a first linear path into engagement with the wrap panel and end panels at a first weld position;

securing the wrap panel to the end panels at said first weld position by actuating the primary welder subassemblies;

rotating the end panels to a second weld position scrolling the wrap panel around said end panels;

moving the primary welder subassemblies in said first linear path back into engagement with the wrap panel and end panels;

further securing the end panels to the wrap panel at said second weld position by actuating the primary welder subassemblies;

rotating the end panels and wrap panel to additional weld positions and moving the primary welder subassemblies in said first linear path back into engagement with the end panels and wrap panel at each of said additional weld positions;

further securing the end panels to the wrap panel at said additional weld positions by actuating the primary welder subassemblies; and then removing the metal housing from the work holder subassembly after securing the end panels to the wrap panel at the last of said additional weld positions.

11. The method defined in claim 10 including the step of rotating the end panels and wrap panel to at least eight additional weld positions.

12. The method defined in claim 10 in which each of the primary welder subassemblies moves in a first common plane toward and away from each other for securing the wrap panel to the end panels at the weld positions.

13. The method defined in claim 12 including the step of moving a pair of secondary welder subassemblies in a pair of parallel second linear paths into engagement with a lip of the wrap panel and end panels after securing the end panels to the wrap panel at the last of said additional weld positions; and then actuating the secondary welder subassemblies to secure the lip of the wrap panel to the end panels.

14. The method defined in claim 13 including the step of further securing the lip of the wrap panel with the end panels by a plurality of welds by indexing said secondary welder subassemblies in said second linear paths.

15. The method defined in claim 13 in which the secondary welder subassemblies move in a second common plane generally perpendicular to the first common plane of the primary welder subassemblies.

16. The method defined in claim 15 including the step of indexing the primary welder subassemblies to a plurality of positions in a pair of parallel third linear paths and applying a series of welds along a substantially straight section of the blower housing to secure the end panels to the wrap panel by actuating said primary welder subassemblies.

17. The method defined in claim 16 including the step of moving the primary welder subassemblies in a fourth linear path when applying said series of welds to the straight section of the blower housing.

18. The method defined in claim 17 in which the first, third and fourth linear paths are in the same plane.

19. The method defined in claim 17 in which the first and fourth linear paths extend in a first common direction; and in which the second and third linear paths extend in a second common direction substantially perpendicular to said first common direction.

20. The method defined in claim 16 including the steps of:

indexing the primary welder subassemblies to the start of a firth linear path;

moving the primary welder subassemblies in said fifth linear path into engagement with the wrap panel and end panels;

actuating said primary welder subassemblies to further secure the end panels to the wrap panel; and then indexing the primary welder subassemblies back to the start of the first linear path prior to rotating the end panels to the second weld position.

21. The method defined in claim 10 further including the step of balancing the work holder subassembly on a column subassembly to maintain an aligned relationship between the metal housing and the primary welder subassembly.

22. The method defined in claim 10 in which the step of rotating the end panels to the additional weld positions is in approximately 30° increments.

23. Apparatus for forming a metal housing having a pair of spaced end panels and an intervening wrap panel connected between the end panels by a plurality of welds, said apparatus including:

a base;

a pair of work-holding subassemblies rotatably mounted on the base for holding the end panels in a position for assembly to the wrap panel to form the housing;

rotating means for rotating the work-holding subassemblies between a plurality of weld positions;

welding means for welding the end panels to the wrap panel;

a stationary side spaced from and similar to an adjustable side, said adjustable side being movable horizontally toward and away from said stationary side by a width adjustment subassembly;

in which each of the stationary and adjustable sides includes a column subassembly which supports the work-holding subassembly and the rotating means on the base, and aligns the end panels and wrap panel with the welding means; and in which each of said column subassemblies includes a vertically extending beam and a guide rail which slidably guides said beam, a pressure cylinder which supports said beam, and cushioning means cooperating with the pressure cylinder for cushioning movement of said column subassembly.

24. Apparatus for forming a metal housing having a pair of spaced end panels and an intervening wrap panel connected between the end panels by a plurality of welds, said apparatus including:

a base;

a pair of work-holding subassemblies rotatably mounted on the base for holding the end panels in a position for assembly to the wrap panel to form the housing;

rotating means for rotating the work-holding subassemblies between a plurality of weld positions;

welding means for welding the end panels to the wrap panel;

a stationary side spaced from and similar to an adjustable side, said adjustable side being movable horizontally toward and away from said stationary side by a width adjustment subassembly;

in which the welding means includes a primary welder subassembly mounted on each of the stationary and adjustable sides, each of said primary welder subassemblies includes a welding gun;

in which each of the stationary and adjustable sides includes a support member and lower carriage subassembly slidably mounted on said support member by guide rails; and in which each of the primary welder subassemblies is mounted on one of said lower carriage subassemblies.

25. The apparatus defined in claim 24 in which each of the stationary and adjustable sides further includes a first pressure cylinder for slidably moving the lower carriage assemblies toward and away from the work-holding subassemblies.

26. The apparatus defined in claim 25 in which the welding means further includes a secondary welder subassembly mounted on each of the stationary and adjustable sides; and in which each of the secondary welder subassemblies includes a pinch gun welder.

27. The apparatus defined in claim 26 in which each of the stationary and adjustable sides includes a upper carriage subassembly slidably mounted on the lower carriage subassembly; and in which each of the secondary welder subassemblies is mounted on one of said upper carriage subassemblies.

28. The apparatus defined in claim 27 in which each of the stationary and adjustable sides further includes a second pressure cylinder for moving the upper carriage subassemblies toward and away from the work-holding subassemblies.

29. The apparatus defined in claim 27 in which adjustment means is mounted on each of the lower carriage subassemblies for vertically adjusting the upper carriage subassemblies and secondary welder subassemblies.

30. The apparatus defined in claim 24 which further includes a pair of roller brackets mounted on the support member for supporting the wrap panel.

31. Apparatus for forming a metal housing having a pair of spaced end panels and an intervening wrap panel connected between the end panels by a plurality of welds, said apparatus including:

a base;

a pair of work-holding subassemblies rotatably mounted on the base for holding the end panels in a position for assembly to the wrap panel to form the housing;

rotating means for rotating the work-holding subassemblies between a plurality of weld positions;

welding means for welding the end panels to the wrap panel;

a stationary side spaced from and similar to an adjustable side, said adjustable side being movable horizontally toward and away from said stationary side by a width adjustment subassembly;

in which one work-holding subassembly is mounted on each of the stationary and adjustable sides;

in which each of said work-holding subassemblies includes an end panel plate and a clamping mechanism attached to said end panel plate for holding the end panels thereon; and in which each clamping mechanism includes a pressure actuated cylinder, a piston rod and a clamping arm.

* * * * *